US010281064B2

(12) United States Patent
Moreau et al.

(10) Patent No.: US 10,281,064 B2
(45) Date of Patent: May 7, 2019

(54) METHOD OF FORMING A HOSE ASSEMBLY

(71) Applicant: Kongsberg Actuation Systems II, Inc., Suffield, CT (US)

(72) Inventors: Leo Moreau, Broad Brook, CT (US); Michael Paulson, Longmeadow, MA (US); Rich Hahn, Ortonville, MI (US); Arjen Schippers, Enschede (NL)

(73) Assignee: KONGSBERG ACTUATION SYSTEMS II, INC., Suffield, CT (US)

( * ) Notice: Subject to any disclaimer, the term of this patent is extended or adjusted under 35 U.S.C. 154(b) by 514 days.

(21) Appl. No.: 14/443,221

(22) PCT Filed: Nov. 15, 2013

(86) PCT No.: PCT/US2013/070342
§ 371 (c)(1),
(2) Date: May 15, 2015

(87) PCT Pub. No.: WO2014/078680
PCT Pub. Date: May 22, 2014

(65) Prior Publication Data
US 2015/0292651 A1    Oct. 15, 2015

Related U.S. Application Data

(60) Provisional application No. 61/727,490, filed on Nov. 16, 2013.

(51) Int. Cl.
*B29D 23/00* (2006.01)
*B32B 37/04* (2006.01)
(Continued)

(52) U.S. Cl.
CPC ............ *F16L 11/08* (2013.01); *B29D 23/001* (2013.01); *B32B 37/04* (2013.01); *B32B 37/24* (2013.01);
(Continued)

(58) Field of Classification Search
CPC ........ F16L 11/08; F16L 11/085; F16L 11/081; F16L 11/082; F16L 11/083; F16L 11/086;
(Continued)

(56) References Cited

U.S. PATENT DOCUMENTS 3,620,875 A * 11/1971 Guglielmo, Sr. ... B29C 65/1425
156/272.4
3,633,629 A *  1/1972 Rider ...................... B29C 53/66
138/127
(Continued)

FOREIGN PATENT DOCUMENTS

CA    2025134 A1    7/1991
CN    102702542 A   10/2012
(Continued)

OTHER PUBLICATIONS

International Search Report for Application No. PCT/US2013/070342 dated Feb. 21, 2014, 3 pages.
(Continued)

*Primary Examiner* — Jeffrey M Wollschlager
(74) *Attorney, Agent, or Firm* — Howard & Howard Attorneys PLLC

(57) ABSTRACT

A method of forming a hose assembly is disclosed. The hose assembly includes a multilayer tube having an inner layer comprising a first polymeric material and an outer layer comprising a second polymeric material and defining an outer peripheral surface. The hose assembly also includes a reinforcing layer comprising reinforcing fibers and disposed about and embedded in the outer peripheral surface of the multilayer tube. The method comprises the steps of extruding the multilayer tube, and disposing reinforcing fibers about the outer peripheral surface of the multilayer tube to form a reinforced multilayer tube. The method also includes the steps of heating the reinforced multilayer tube to a temperature which is greater than a peak melting tempera-
(Continued)

ture of the second polymeric material, and cooling the reinforced multilayer tube to solidify the melted outer layer and embed the reinforcing layer in the outer layer to form the hose assembly.

12 Claims, 18 Drawing Sheets

(51) Int. Cl.
　　*B32B 37/24* (2006.01)
　　*F16L 11/08* (2006.01)
　　*B29K 105/08* (2006.01)
　　*B29K 105/24* (2006.01)
　　*B29K 277/00* (2006.01)

(52) U.S. Cl.
　　CPC ..... *F16L 11/085* (2013.01); *B29K 2105/0827* (2013.01); *B29K 2105/24* (2013.01); *B29K 2277/00* (2013.01); *B32B 2037/243* (2013.01); *B32B 2597/00* (2013.01)

(58) Field of Classification Search
　　CPC ...... F16L 11/087; F16L 11/088; F16L 11/112; B32B 37/24; B32B 2597/00; B32B 37/04; B32B 2037/243; B29D 23/001; B29K 2277/00; B29K 2105/24; B29K 2105/0827
　　See application file for complete search history.

(56) References Cited

U.S. PATENT DOCUMENTS

| | | | |
|---|---|---|---|
| 3,722,550 A | 3/1973 | Matthews | |
| 4,000,760 A * | 1/1977 | Heller, Jr. | B29D 23/001 138/141 |
| 4,196,464 A | 4/1980 | Russell | |
| 4,259,991 A | 4/1981 | Kutnyak | |
| 4,276,908 A | 7/1981 | Horne | |
| 4,341,578 A * | 7/1982 | Chermak | B29C 47/023 156/149 |
| 4,444,816 A | 4/1984 | Richards et al. | |
| 4,559,782 A | 12/1985 | Ritchey et al. | |
| 4,694,622 A | 9/1987 | Richard | |
| 4,952,262 A * | 8/1990 | Washkewicz | B29C 47/0016 138/125 |
| 5,062,456 A | 11/1991 | Cooke et al. | |
| 5,142,782 A | 9/1992 | Martucci | |
| 5,192,476 A | 3/1993 | Green | |
| 5,381,834 A | 1/1995 | King | |
| 5,383,087 A * | 1/1995 | Noone | B32B 1/08 138/137 |
| 5,613,524 A * | 3/1997 | Martucci | F16L 11/08 138/103 |
| 5,667,499 A * | 9/1997 | Welch | A61M 25/0012 138/125 |
| 5,792,401 A * | 8/1998 | Burnham | A61M 25/0012 264/103 |
| 6,039,084 A * | 3/2000 | Martucci | F16L 11/085 138/131 |
| 6,066,377 A | 3/2000 | Tonyali et al. | |
| 6,109,306 A * | 8/2000 | Kleinert | F16L 11/083 138/125 |
| 6,213,995 B1 * | 4/2001 | Steen | A61B 18/14 604/527 |
| 6,302,150 B1 * | 10/2001 | Martucci | B29D 23/001 138/125 |
| 6,399,714 B1 | 6/2002 | Huang et al. | |
| 6,758,245 B2 | 7/2004 | Troschitz et al. | |
| 6,978,805 B2 * | 12/2005 | D'Amico | F16L 11/085 138/125 |
| 7,114,526 B2 | 10/2006 | Takagi et al. | |
| 7,357,968 B2 | 4/2008 | Sausner et al. | |
| 8,048,351 B2 * | 11/2011 | Bentley | B29C 44/22 138/127 |
| 2002/0182961 A1 * | 12/2002 | Clercq | B29C 70/22 442/316 |
| 2003/0129336 A1 * | 7/2003 | Bourgois | D04C 1/02 428/35.7 |
| 2003/0178082 A1 | 9/2003 | Yamaguchi et al. | |
| 2004/0062895 A1 | 4/2004 | Sausner et al. | |
| 2004/0225278 A1 | 11/2004 | Poole et al. | |
| 2005/0005989 A1 * | 1/2005 | Roloff | B32B 1/08 138/137 |
| 2006/0030753 A1 | 2/2006 | Boutillette et al. | |
| 2006/0151043 A1 | 7/2006 | Nanney et al. | |
| 2006/0182914 A1 | 8/2006 | Yasumatsu et al. | |
| 2007/0181202 A1 | 8/2007 | Polasky | |
| 2008/0066822 A1 * | 3/2008 | Varkey | F16L 11/081 138/124 |
| 2008/0072984 A1 | 3/2008 | Branch et al. | |
| 2008/0302437 A1 | 12/2008 | Lovett et al. | |
| 2009/0151805 A1 * | 6/2009 | Martino | F16L 11/088 138/125 |
| 2009/0169790 A1 | 7/2009 | Nadeau et al. | |
| 2009/0250133 A1 | 10/2009 | Polasky | |
| 2010/0170632 A1 | 7/2010 | Gautriaud et al. | |
| 2010/0180975 A1 | 7/2010 | Martucci et al. | |
| 2010/0218839 A1 * | 9/2010 | Conley | B29C 44/1285 138/130 |
| 2010/0266789 A1 * | 10/2010 | Conley | B29D 23/001 428/34.1 |
| 2010/0310805 A1 | 12/2010 | Ou et al. | |
| 2011/0036442 A1 | 2/2011 | Hahn et al. | |
| 2012/0058268 A1 | 3/2012 | Martucci et al. | |
| 2016/0245432 A1 * | 8/2016 | Fonfara | B32B 1/08 |

FOREIGN PATENT DOCUMENTS

| | | |
|---|---|---|
| EP | 0172093 A1 | 2/1986 |
| EP | 0439898 A2 | 8/1991 |
| EP | 0629805 A2 | 12/1994 |
| EP | 0934007 | 4/1998 |
| EP | 0855170 A2 | 7/1998 |
| EP | 0806779 B1 | 11/2001 |
| EP | 1314923 A1 | 5/2003 |
| EP | 1196709 B1 | 4/2005 |
| EP | 1979662 | 8/2007 |
| EP | 1857259 A1 | 11/2007 |
| EP | 2072066 A1 | 6/2009 |
| EP | 2244875 | 7/2009 |
| EP | 2445980 | 1/2011 |
| EP | 1991611 B1 | 11/2011 |
| GB | 862505 | 3/1961 |
| GB | 2088397 A | 6/1982 |
| JP | S5912936 A | 1/1984 |
| JP | 2003327634 A | 11/2003 |
| WO | WO 2004/023026 A1 | 3/2004 |
| WO | WO 2009/085997 A1 | 7/2009 |
| WO | WO 2011/005443 A2 | 1/2011 |
| WO | WO 2011/011268 A1 | 1/2011 |
| WO | WO 2011/126840 A1 | 10/2011 |
| WO | WO 2013/165452 A1 | 11/2013 |
| WO | WO 2013/165453 A1 | 11/2013 |
| WO | WO 2014/078661 A1 | 5/2014 |

OTHER PUBLICATIONS

English language abstract and machine-assisted English translation for CN 102702542 extracted from espacenet.com database on Jul. 31, 2015, 14 pages.

English language abstract and machine-assisted English translation for EP 1857259 extracted from espacenet.com database on May 14, 2015, 19 pages.

English language abstract and machine-assisted English translation for JP 2003327634 extracted from espacenet.com database on Jul. 31, 2015, 7 pages.

(56) References Cited

OTHER PUBLICATIONS

English language abstract for JP S5912936 extracted from espacenet.com database on Aug. 27, 2015, 1 pages.

* cited by examiner

US 10,281,064 B2

METHOD OF FORMING A HOSE ASSEMBLY

CROSS REFERENCE TO RELATED APPLICATION

This application is the National Stage of International Patent Application No. PCT/US2013/070342, filed on Nov. 15, 2013, which claims the benefit of U.S. Provisional Patent Application Ser. No. 61/727,490, filed on Nov. 16, 2012, the disclosures of which are hereby incorporated by reference.

FIELD OF THE DISCLOSURE

The present disclosure generally relates to a method of forming a hose assembly for conveying fluids and a method of forming the hose assembly.

BACKGROUND OF THE DISCLOSURE

Hose assemblies for conveying fuel and other corrosive fluids are well known in the art. These types of hose assemblies are exposed to a variety of fluids, such as foods, fuel mixtures, fuel additives, and chemicals in addition to being exposed to extreme pressures, temperatures, and environmental conditions. Further, these hose assemblies are subjected to physical stresses, such as bending, repeated movement, and forces. Accordingly, these hose assemblies should be resistant to chemical and physical degradation.

These types of hose assemblies typically include a hose formed from polymeric material and one ore more reinforcing layers. Mono- or multi-layer hoses formed from polymeric materials generally have low tensile strength, which often causes the hose to have low hoop strength. Consequently, the hose can be susceptible to kinking and other problems. As such, reinforcing layers are added to these hose assemblies to provide additional strength, durability, and kink resistance.

However, methods of forming hose assemblies including one or more reinforcing layers are often complex and costly. As each individual reinforcing layer is added, a binding emulsion composition or a tie layer is typically required to bond the individual reinforcing layers together. As such, the method typically includes many complicated steps and precludes use of reinforcing layers without additional applications of the binding emulsion composition or tie layers. Also, the binding emulsion composition or tie layer can fail to facilitate consistent wetting of the hose and the reinforcing layers, which consequently can cause the hose to delaminate from the reinforcing layers, which, in turn, can cause the hose to kink or even tear. Further, hose assemblies including one or more reinforcing layers often exhibit reduced flexibility, bendability, and deformation after exposure to elevated temperatures. As such, there remains an opportunity to develop an efficient and cost-effective method of forming a hose assembly that is resistant to kinking, flexible, bendable, resistant to deformation after thermal conditioning at higher temperatures, and durable, e.g. exhibits cohesive/destructive delamination of the reinforcing layer from the hose.

SUMMARY OF THE DISCLOSURE

A method of forming a hose assembly is disclosed. The hose assembly includes a multilayer tube having an inner layer comprising a first polymeric material and an outer layer comprising a second polymeric material and defines an outer peripheral surface. The hose assembly also includes a reinforcing layer comprising reinforcing fibers and disposed about and embedded in the outer peripheral surface of the multilayer tube. The method comprises the steps of extruding the multilayer tube, and disposing reinforcing fibers about the outer peripheral surface of the multilayer tube to form a reinforced multilayer tube. The method also includes the steps of heating the reinforced multilayer tube to a temperature ($T_1$) which is greater than a peak melting temperature of the second polymeric material to at least partially melt the outer layer, but which is less than a peak melting temperature of the first polymeric material so that the inner layer and inner peripheral surface of the multilayer tube does not soften and thus maintains dimensional integrity, and cooling the reinforced multilayer tube to solidify the melted outer layer and embed the reinforcing fibers in the outer layer to form the hose assembly.

A reinforced multilayer tube for forming the hose assembly is also disclosed. The reinforced multilayer tube includes the multilayer tube. The multilayer tube comprises the inner layer comprising the first polymeric material which defines the inner peripheral surface of the multilayer tube, and the outer layer comprising a second polymeric material which defines the outer peripheral surface of the multilayer tube. The peak melting temperature of the first polymeric material is greater than the peak melting temperature of the second polymeric material. The reinforced multilayer tube also includes the reinforcing layer comprising reinforcing fibers and disposed about the outer peripheral surface of said multilayer tube.

The method of forming the hose assembly and the reinforced multilayer tube for forming the hose assembly are efficient and cost-effective. The hose assembly formed with the method and the reinforced multilayer tube is resistant to kinking, flexible, bendable, resistant to deformation after thermal conditioning at higher temperatures, and durable, e.g. exhibits cohesive/destructive delamination of the reinforcing layer from the hose.

BRIEF DESCRIPTION OF THE DRAWINGS

Advantages of the present disclosure will be readily appreciated as the same becomes better understood by reference to the following detailed description when considered in connection with the accompanying drawings.

The drawings are illustrative of the invention, and it is to be understood that the drawings are not necessarily to scale and the components within each individual drawing are not necessarily to scale. To this end, the drawings are intended to be descriptive and not limiting in nature. Many modifications and variations of the drawings are possible in light of the teachings below.

DETAILED DESCRIPTION

Figure 1:
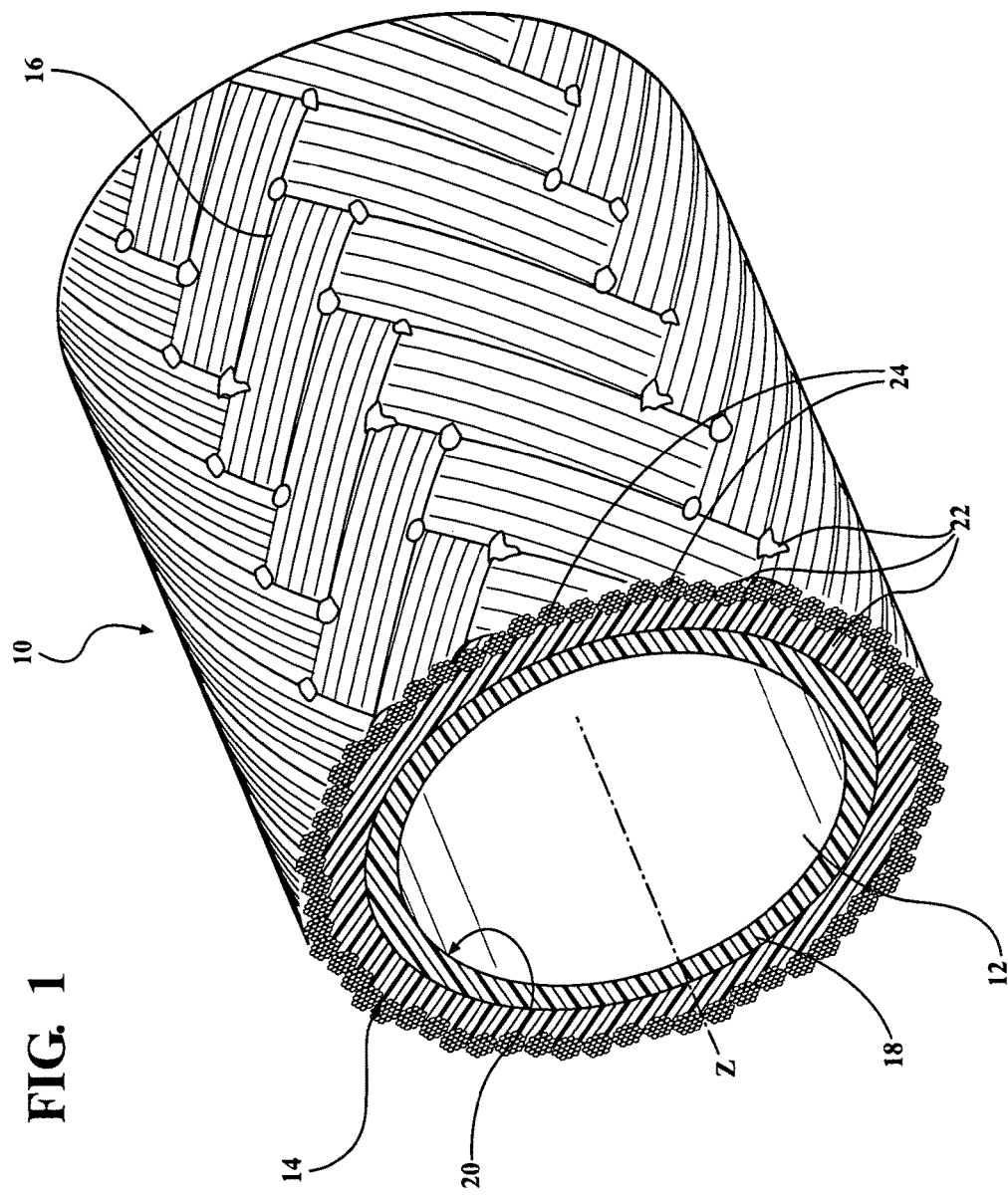
FIG. 1 is a partial cross-sectional perspective view of a hose assembly comprising a multilayer tube and a reinforcing layer disposed about and embedded in an outer peripheral surface of the multilayer tube.

Referring to the Figures wherein like numerals indicate like or corresponding parts throughout the several views a hose assembly 10 is generally shown in FIG. 1. As is described in detail below, the hose assembly 10 comprises a multilayer tube 12 defining an outer peripheral surface 14, and a reinforcing layer 16 disposed about and embedded in the outer peripheral surface 14 of the multilayer tube 12. The multilayer tube 12 includes an inner layer 18 comprising a first polymeric material which defines an inner peripheral surface 20 of the multilayer tube 12, and an outer layer 22 comprising a second polymeric material which defines the outer peripheral surface 14 of the multilayer tube 12. Of course, the multilayer tube 12 can include one or more intermediate layers disposed between the inner and outer layers 18, 22.

The hose assembly 10 is typically used for conveying fluids, such as fuels, chemicals, etc. The hose assembly 10 is particularly suitable for use in the transportation industry, e.g. in vehicles; however, it is to be appreciated that the hose assembly 10 is not limited to the transportation industry. For example, the hose assembly 10 can be utilized in the chemical industry, the food industry, and any other suitable industry.

Referring to FIG. 1, the hose assembly 10 includes the multilayer tube 12 defining a tubular configuration along an axis Z. The multilayer tube 12 is resistant to chemical and thermal degradation. The multilayer tube 12 includes the inner layer 18 comprising the first polymeric material which defines the inner peripheral surface 20 of the multilayer tube 12, and the outer layer 22 comprising the second polymeric material which defines the outer peripheral surface 14 of the multilayer tube 12. The inner peripheral surface 20 of the multilayer tube 12 is smooth such that minimal turbulence is created as fluid flows therethrough. The outer peripheral surface 14 of the multilayer tube 12 can be smooth or textured.

The multilayer tube 12 is advantageous over monolayer tubes in that the layers can comprise different materials, and thus provide advantages associated with the different materials. For example, the multilayer tube 12 can include the inner layer 18 which is thermally stable and the outer layer 22 which softens during formation of the hose assembly 10 so that the reinforcing layer 16 embeds in the outer layer 22 to provided excellent adhesion between the reinforcing layer 16 and the multilayer tube 12. As another example, the multilayer tube 12 may include the inner layer 18 comprising fluorocarbon polymer that defines the inner peripheral surface 20 which is resistant to chemical and thermal degradation and the outer layer 22 comprising polyamide that defines the outer peripheral surface 14 of the multilayer tube 12 which is durable and provides excellent high temperature resistance.

The one or more layers (e.g. the inner layer 18, the outer layer 22) of the multilayered tube 12 are formed from a polymeric material. Suitable, non-limiting examples of the polymeric material which can be used to form the layers of the multilayer tube 12 include polyethylene, polypropylene, polyvinylchloride, polyethyleneterephtalate ("PET"), polybutyleneterepthalate ("PBT"), polyamides, fluoropolymers, or copolymers thereof. Suitable, non-limiting examples of particular fluoropolymers include polytetrafluoroethylene ("PTFE"), Fluorinated Ethylene Propylene ("FEP"), Perfluoroalkoxy ("PFA"), and ethylenetetrafluoroethylene ("ETFE"). Suitable, non-limiting examples of particular polyamides include PA11, PA12, PA610, PA612, PA1010, PA6, PA66, PA1110T, PA1212T, and blends thereof.

As set forth above, the multilayer tube 12 includes the inner layer 18 comprising the first polymeric material which defines the inner peripheral surface 20 of the multilayer tube 12, and the outer layer 22 comprising the second polymeric material which defines the outer peripheral surface 14 of the multilayer tube 12. Of course, the multilayer tube 12 can include one or more intermediate layers disposed between the inner and outer layers 18, 22.

In one embodiment the multilayer tube 12 includes three layers (has one intermediate layer between the inner layer 18 and the outer layer 22). In another embodiment, the multilayer tube 12 includes four layers (has two intermediate layers between the inner layer 18 and the outer layer 22).

In one embodiment, the outer layer 22 which comprises the second polymeric material and defines the outer peripheral surface 14 of the multilayer tube 12 is formed from fibers of the second polymeric material. In this embodiment, the fibers comprising the second polymeric material are disposed about the outer peripheral surface 14 of the multilayer tube 12 via braiding, helically winding, knitting, twisting, or wrapping.

Of course, the first and the second polymeric materials can be selected from the non-limiting examples of the polymeric materials above. The second polymeric material is typically a semi-crystalline or amorphous thermoplastic polymer. The second polymeric material typically comprises fluoropolymers and copolymers thereof or polyamides and copolymers thereof. Examples of suitable fluoropolymers include, but are not limited to, PTFE, FEP, PFA, ETFE, and blends thereof. Examples of suitable polyamides include, but are not limited to, PA11, PA12, PA610, PA612, PA1010, PA6, PA66, PA1110T, PA1212T, and blends thereof.

The peak melting temperature of the first polymeric material is greater than, alternatively at least 15° C. greater than, alternatively at least 25° C. greater than, alternatively at least 50° C. greater than, alternatively from 1 to 150° C. greater than, alternatively from 1 to 100° C. greater than, alternatively from 1 to 50° C. greater than, alternatively from 1 to 25° C. greater than the peak melting temperature of the second polymeric material.

The onset and peak melting temperatures referred to throughout this disclosure are measured in accordance with ASTM D3418-12. ASTM D3418-12 is a standard test method for determining transition temperatures, enthalpies of fusion, and crystallization of polymers by differential scanning calorimetry ("DSC"). DSC measures both the onset melting temperature and the peak melting temperature. The onset melting temperature (also referred to as $T_o$) is the temperature at which the polymer begins to soften. The peak melting temperature (also referred to as $T_p$) is the temperature at which complete melting of the polymer occurs. The peak melting temperature as used herein, and as known in the art, can also be referred to as the melting point. The peak melting temperature is related to the enthalpy of thermal transition and is influenced by the polymer's crystallinity.

In various embodiments, the multilayer tube 12 is electrically conductive. The multilayer tube 12 can also include an integral conductor along a length of the multilayer tube 12 for preventing build up of electrical charge. As fluid flows through the multilayer tube 12, electrical charges tend to build throughout the length of the multilayer tube 12. In order to prevent these electrical charges from accumulating, in various embodiments, the multilayer tube 12 has the integral conductor which functions as an integral longitudinal conductive means coextensive with the length of the multilayer tube 12 for conducting an electrical charge. In one specific embodiment, the integral conductor is a conductive strip of carbon black, e.g. the multilayer tube 12 has a conductive strip of carbon black. Carbon black is electrically conductive and will dissipate any electrical charges built up by the fluid. This is done by using carbon black about the multilayer tube 12. It should be appreciated that other conductive material may be used to form the integral conductor. In one specific embodiment, the inner layer 18 of the multilayer tube 12 is a monolayer tube 12 comprising PTFE formed from a billet comprising an inner material (e.g. conductive PTFE) and an outer material (e.g. non-conductive PTFE) and thus the inner peripheral surface 20 of the monolayer tube 12 is conductive. Alternatively, the entire inner layer 18 of the multilayer tube 12 can comprise the conductive means, e.g. can be formed from conductive PTFE. Alternatively, the multilayer tube 12 can comprise a conductive inner layer 18 and a non-conductive outer layer 22. In most embodiments, the reinforcing layer 16 is not electrically conductive. As such, electrical changes applied to the reinforcing layer 16 will not be conducted throughout the hose assembly 10 or to the fluid passing through the interior of the multilayer tube 12.

Still referring to FIG. 1, hose assembly 10 further includes the reinforcing layer 16 for increasing the strength, durability, and bending properties of the hose assembly 10. The reinforcing layer 16 is disposed about the multilayered tube 12. The reinforcing layer 16 comprises reinforcing fibers 24 (typically in the form of yarn) that are braided, helically wound, knitted, or wrapped about the tube 12 and optionally a binder 26. The reinforcing layer 16 typically covers greater than 30, alternatively greater than 40, alternatively greater than 50, alternatively greater than 60, alternatively greater than 70, alternatively greater than 80, alternatively greater than 90, alternatively greater than 95, % of the outer peripheral surface 14 of the tube 12. In one embodiment, the reinforcing layer 16 typically covers about 50% of the outer peripheral surface 14 of the tube 12. In another embodiment, the reinforcing layer 16 typically covers about 100% of the outer peripheral surface 14 of the tube 12.

The reinforcing layer 16 can comprise one or more different types of reinforcing fibers 24. The reinforcing fibers 24 are typically in the form of monofilament, multifilament, or staple yarn (reinforcing yarn). The reinforcing yarn can comprise one or more types of reinforcing fibers 24. The reinforcing fibers 24 typically comprise a polymer, a ceramic, a fiberglass, a metal, or combinations thereof. In one embodiment, the reinforcing fibers 24 comprise fiberglass. Examples of suitable glass reinforcing fibers 24 include, but are not limited to, E-glass (alumina-calcium-borosilicate), S2 glass (magnesium-alumino-silicate), C glass (calcium borosilicate), R glass (calcium-alumino-silicate), silica, quartz, and combinations thereof. Examples of other suitable fibers include, but are not limited to, Basalt fiber, ceramic fiber, aramid fiber (e.g. NOMEX® and KEVLAR® fiber), semi-aromatic polyamide fiber, and combinations thereof. Of course, as is set forth above, one or more different types of reinforcing fibers 24 can be used, i.e., blends of any of the reinforcing fibers 24 described herein can be used. In a preferred embodiment, the reinforcing fibers 24 comprise E-glass fiber. Reinforcing fibers 24 comprising fiberglass provide strength to reinforce the multilayer tube 12 and are thermally stable at elevated temperatures, which is beneficial for use in high temperature environments, e.g. under the hood of vehicles.

The hose assembly 10 optionally includes the binder 26 comprising a polymeric material. In a typical embodiment, the binder 26 is formed from a binder composition, an adhesive layer, and/or a binder fiber 28. Functionally, the binder 26 bonds the components of the hose assembly 10 (e.g., the multilayer tube 12, the reinforcing layer 16) together to bind, seal, and coat the hose assembly 10 thereby improving chemical resistance, thermal resistance, environmental resistance, durability, flexibility, hoop strength and kink resistance of the hose assembly 10. If included, the binder 26 typically includes a polymer that is compatible with, e.g., miscible with, the second polymeric material of the outer layer of the multilayer tube 12. As such, the polymer or polymers of the binder 26 should be similar to the second polymeric material (e.g., when the second polymeric material is a polyamide the binder 26 may include a polyamide, or when the second polymeric material is a fluoropolymer, the binder 26 may include a fluoropolymer). Of course, various embodiments of the hose assembly 10 which are free of the binder 26 have been contemplated herein. In some embodiments, the reinforcing layer 16 embedded in the multilayer tube 12 provides sufficient durability so that the binder 26 is not required.

In one embodiment, the hose assembly 10 includes the binder 26 formed from a binder composition. The binder composition comprises a fluidic carrier, such as water, having one or more polymers dispersed therein.

In this embodiment, the binder composition typically includes a polymer that is resistant to chemical and thermal degradation and is also chemically compatible with, e.g., miscible with, the second polymeric material of the outer layer 22 of the multilayer tube 12. As such, the polymer or polymers of the binder composition should be similar to the second polymeric material (e.g., when the second polymeric material is a polyamide the binder composition may include a polyamide, or when the second polymeric material is a fluoropolymer, the binder composition may include a fluoropolymer). Typically, the polymer is a halogenated polymer or a polyamide. In one embodiment, the polymer is a polyamide. In another embodiment, the polymer is a fluoropolymer. Suitable fluoropolymers include, but are not limited to, polytetrafluoroethylene (PTFE), ethylene tetrafluoroethylene (ETFE), fluorinated ethylenepropylene (PEP), polyvinylidine fluoride (PVDF), perfluoroalkoxy fluorocarbons (PFA), and polychlorotrifluoroethylene (PCTFE). In certain embodiments, the first polymeric material is polytetrafluoroethylene sold under the trade name TEFLON® 3859 and commercially available from DuPont of Wilmington, Del.

The binder composition can also include one or more additives. Suitable additives include, but are not limited to, surfactants, chain-extenders, cross-linkers, chain-terminators, processing additives, adhesion promoters, anti-oxidants, defoamers, blowing agents, flame retardants, catalysts, anti-foaming agents, water scavengers, molecular sieves, fumed silicas, ultraviolet light stabilizers, fillers, thixotropic agents, silicones, colorants, pigments, inert diluents, and combinations thereof. If included, the additives can be included in the binder composition in various amounts.

The binder composition is applied to a partially constructed hose assembly 10 and is typically passed through a preheated oven to remove the fluidic carrier and cure the polymer to form the binder 26. The binder 26 is on the outer peripheral surface 14 of the multilayer tube 12 and dispersed throughout the reinforcing fibers of the reinforcing layer 16.

In another embodiment, the binder 26 is formed from binding fibers. More specifically, the reinforcing layer 16 is formed from a commingled braid 30 comprising the reinforcing fibers 24 and the binding fibers 28. In this embodiment, the binding fibers 28 soften and/or melt to form the binder 26 binds (1) the reinforcing fibers 24 within the reinforcing yarn together, (2) the strands of reinforcing yarn together, and (3) the strands of reinforcing yarn to the outer peripheral surface 14 of the multilayer tube 12.

The commingled braid 30 can comprise one or more different types of the reinforcing fibers 24 described above.

The commingled braid 30 also comprises one or more different types of binding fiber. The binding fibers 28 are typically in the form of monofilament strands or multifilament yarn. The binding yarn can comprise one or more types of binding fiber. The binding fibers 28 typically comprises one or more polymers selected in consideration of their rheological properties at elevated temperatures as well as their compatibility with (ability to bind the reinforcing layer 16 to the multilayer tube 12) the material of the outer peripheral surface 14 of the multilayer tube 12. In one embodiment, the binding fibers 28 typically comprise a polymer which has a peak melting temperature that is close to (e.g. within 20° C.) the peak melting temperature of the material of the outer peripheral surface 14 of the multilayer tube 12 and which is also compatible with the material of the outer peripheral surface 14 of the multilayer tube 12. The binding fibers 28 typically comprise a semi-crystalline or amorphous polymer.

In one embodiment, the binding fibers 28 comprise a semi-crystalline polymer which is resistant to chemical and thermal degradation. Examples of polymers suitable for the binding fibers 28 include, but are not limited to, polyethylene, polypropylene, polyvinylchloride, PET, PBT, polyamide, fluoropolymer, and copolymers thereof.

In another embodiment, the binding fibers 28 comprise a fluoropolymer. Examples of suitable fluoropolymers include, but are not limited to, PTFE, FEP, PFA, and ETFE. In yet another embodiment, the binding fibers 28 comprise a polyamide. Examples of suitable polyamides include, but are not limited to, PA11, PA12, PA610, PA612, PA1010, PA6, PA66, PA1110T, PA1212T, and blends thereof.

Of course, the commingled braid 30 which is used to form the reinforcing layer 16 can include different types of binding fiber. For example, the commingled braid 30 can include binding yarns comprising different binding fibers 28 or having different diameters. To this end, the binding fibers 28 can comprise different types of binding fibers 28. For example, the binding fibers 28 can include binding fibers 28 comprising different polymers or having different diameters.

The form of the reinforcing fibers 24 and the binding fibers 28 can impact the configuration of the commingled braid 30. For example, when one or more strands of monofilament binding fibers 28 are included in the commingled braid 30, a preferred embodiment is to dispose or "wrap" the strands of monofilament binding fibers 28 about the exterior of braided reinforcing fibers 24 to form the commingled braid 30. The commingled braid 30 of this configuration exhibit excellent adhesion to the multilayer tube 12. Of course, when one or more strands of monofilament binding fiber 28 are included in the commingled braid 30, the strands of monofilament binding fiber 28 can be braided with the reinforcing fibers 24 to form the commingled braid 30. The commingled braid 30 of this configuration exhibit excellent cohesive strength and excellent adhesion to the multilayer tube 12.

In another embodiment, when yarn comprising multifilament binding fibers 28 is included in the commingled braid 30, the yarn comprising multifilament binding fiber 28 can be braided directly with strands of reinforcing fibers 24 or disposed or "wrapped" about the monofilament binding fiber 28 about the exterior of braided reinforcing fiber. Because the multifilament yarn comprising binding fibers 28 includes binding fiber which is typically smaller in diameter and less densely packed than monofilament strands of binding fiber, multifilament binding fibers 28 are believed to melt quickly and provide a robust bond between the reinforcing fibers 24 and the multilayer tube 12.

As described above, the binding fibers 28 typically comprise a polymer which is compatible with the material of the outer peripheral surface 14 of the multilayer tube 12 such that the binding fibers 28 melt to form the binder 26 that bonds to the multilayer tube 12 and the reinforcing fibers 24. Compatibility is typically achieved by bonding similar polymers to one another. For example, binding fibers 28 comprising fluoropolymer are typically compatible with/adheres well to the outer peripheral surface 14 of the multilayer tube 12 which is formed from another fluoropolymer. As another example, binding fibers 28 comprising a polyamide are typically compatible with/adheres well to the outer peripheral surface 14 of the multilayer tube 12 which is formed from another polyamide. However, the disclosure is not limited to like polymers bonding to each other. For example, binding fibers 28 comprising one type of fluoropolymer, e.g. PEP, can be used with the multilayer tube 12 having the outer peripheral surface 14 formed with another type of fluoropolymer, e.g. PTFE. As another example, binding fibers 28 comprising a functionally modified fluoropolymer, e.g. functionally modified ETFE can be used with the multilayer tube 12 tube having the outer peripheral surface 14 formed from a polyamide, e.g. PA 6, 12. As yet another example, binding fibers 28 comprising polyamide, e.g. PA 6, 12 can be used with the multilayer tube 12 having the outer peripheral surface 14 formed from a functionally modified fluoropolymer, e.g. functionally modified ETFE.

Various embodiments of the commingled braid 30 are discussed below. In various embodiments, the commingled braid 30 comprises from 55 to 95, alternatively from 65 to 85 percent by volume reinforcing fiber, and from 5 to 45, alternatively from 15 to 35, percent by volume binding fiber. Alternatively, in various embodiments from 1 to 15, alternatively from 1 to 8, reinforcing strands, and from 1 to 6, alternatively from 1 to 3, monofilament binding fiber 28 can be helically wrapped about or within the braided reinforcing fibers 24 to form the commingled braid 30. Specifically, referring now to FIGS. 2-9, various non-limiting embodiments of the commingled braid 30 are shown.

As alluded to above, in one embodiment, the commingled braid 30 comprises a monofilament or multifilament binding fibers 28 helically wrapped about the exterior of braided reinforcing fiber. In this embodiment from 1 to 15, alternatively from 1 to 8, reinforcing strands can be braided together, and from 1 to 6, alternatively from 1 to 3, monofilament binding fiber 28 can be helically wrapped about the braided reinforcing fiber. In this embodiment, monofilament binding fiber 28 is typically wrapped around the braided reinforcing fibers 24 at a frequency of from 0.1 to 10 twists per inch, alternatively from 0.5 to 3, alternatively from 1 to 2.6, twists per inch. Of course, the frequency of twists will depend on the size of the monofilament binding fiber 28 and the number of strands/ends of the monofilament binding fiber 28 and can vary outside the ranges set forth above.

Figure 2:
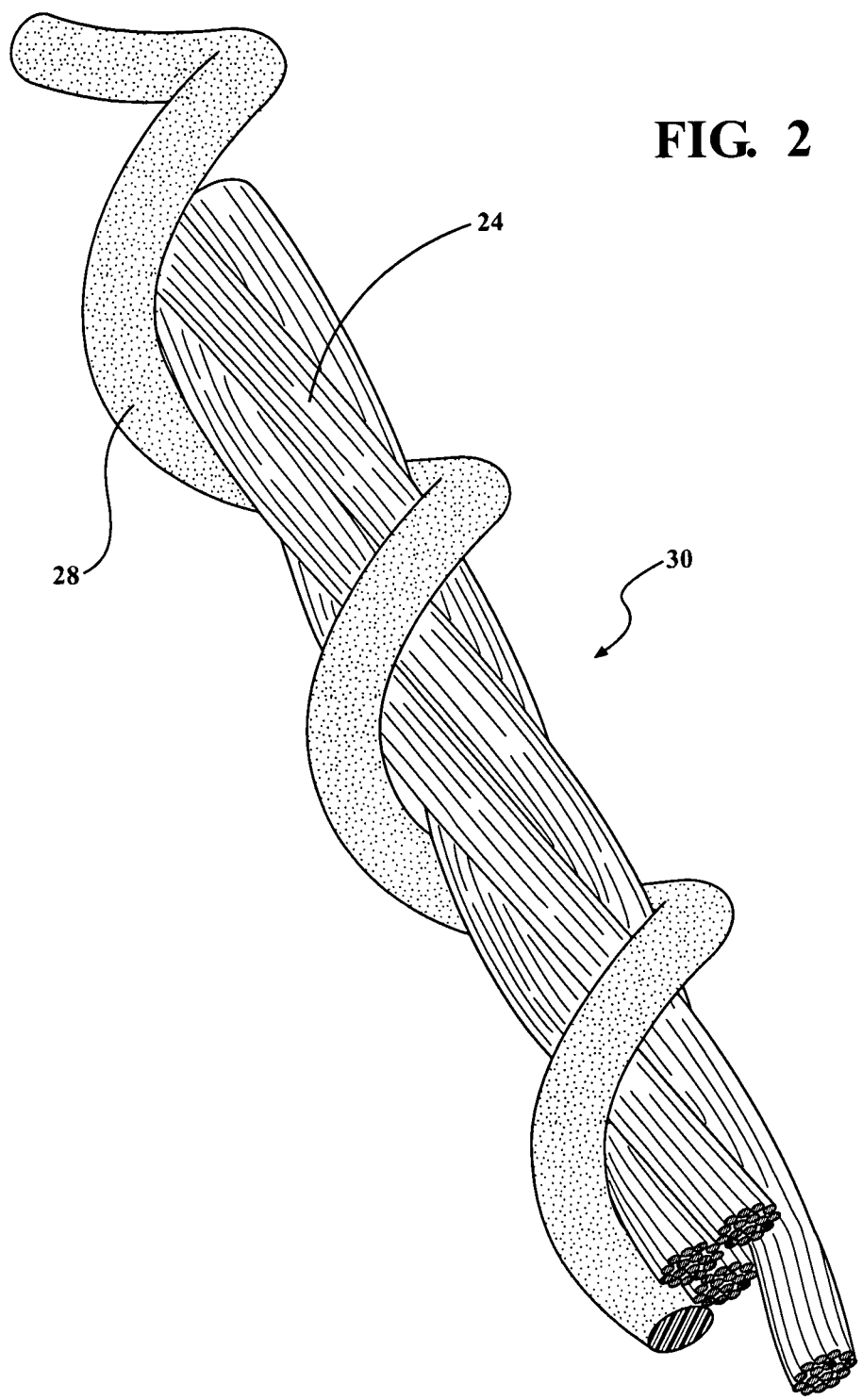
FIG. 2 is a partial cross-sectional perspective view of a commingled braid comprising four braided strands of reinforcing yarn comprising reinforcing fibers, and a single strand of monofilament binding fiber counter-wrapped helically about the four braided strands of reinforcing yarn.
Figure 3:
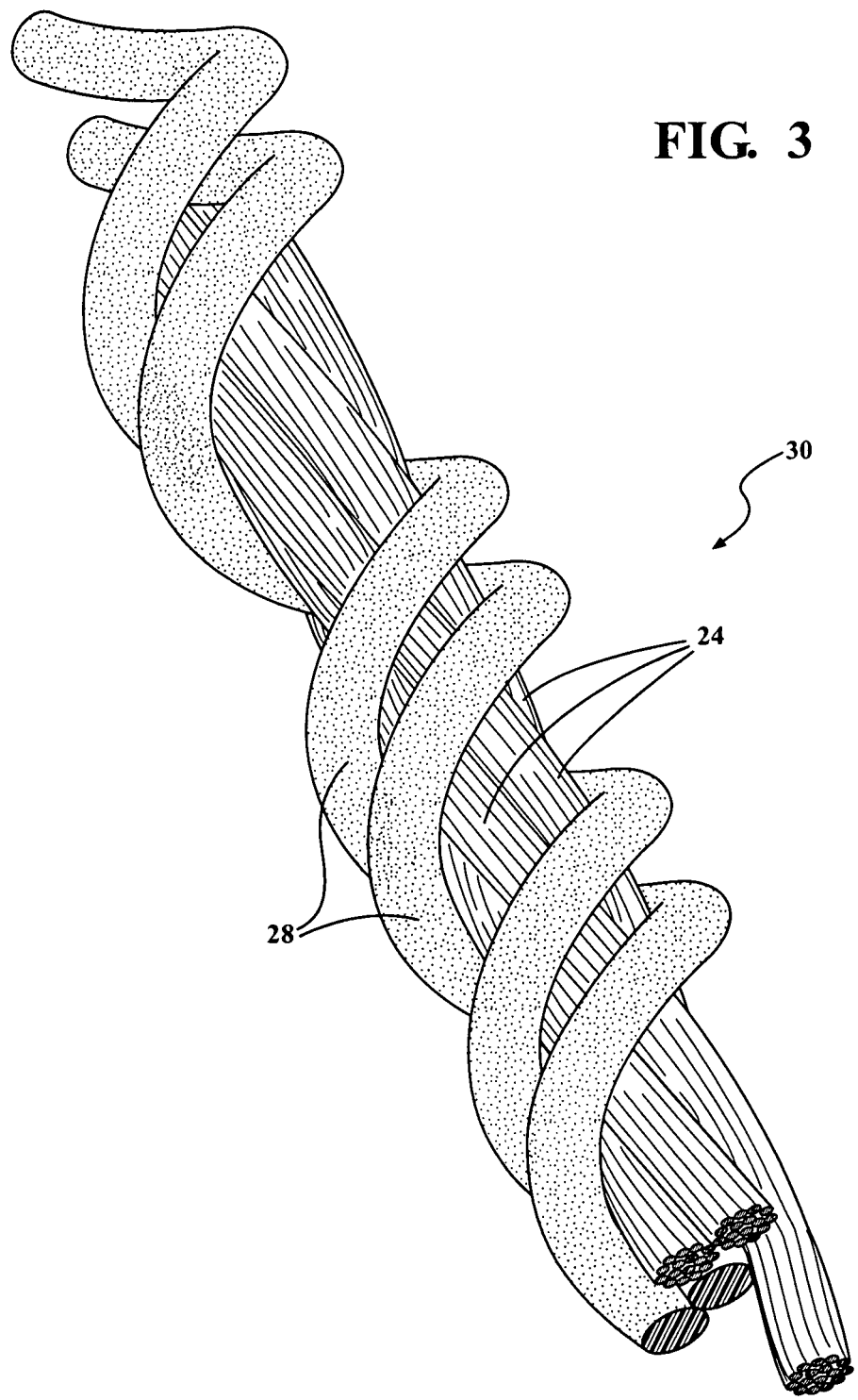
FIG. 3 is a partial cross-sectional perspective view of a commingled braid comprising four braided strands of reinforcing yarn comprising reinforcing fibers, and two strands of monofilament binding fiber counter-wrapped helically about the four braided strands of reinforcing yarn.
Figure 4:
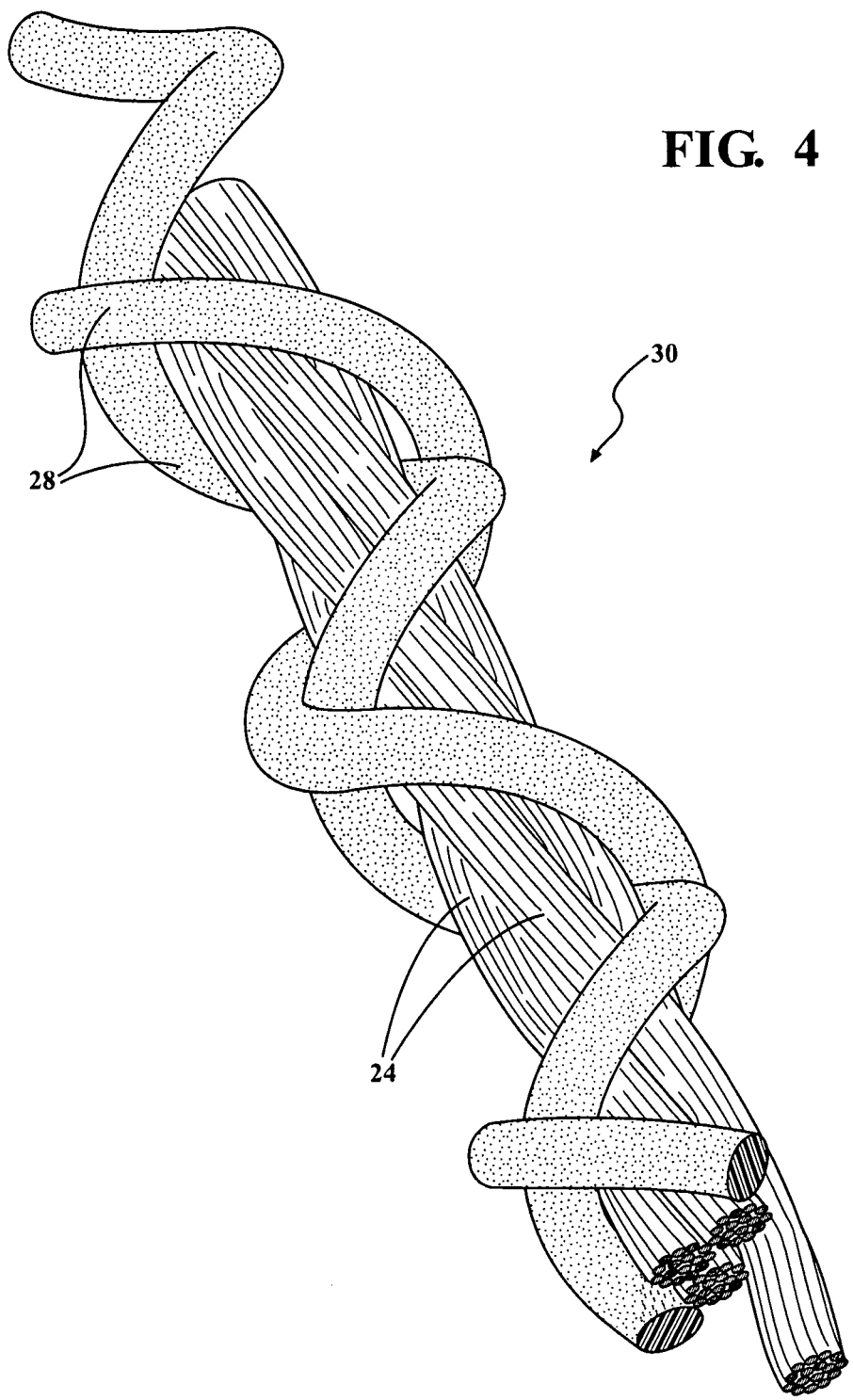
FIG. 4 is a partial cross-sectional perspective view of a commingled braid comprising four braided strands of reinforcing yarn comprising reinforcing fibers, and two strands of monofilament binding fiber cross-wrapped about the four braided strands of reinforcing yarn.
Figure 5:
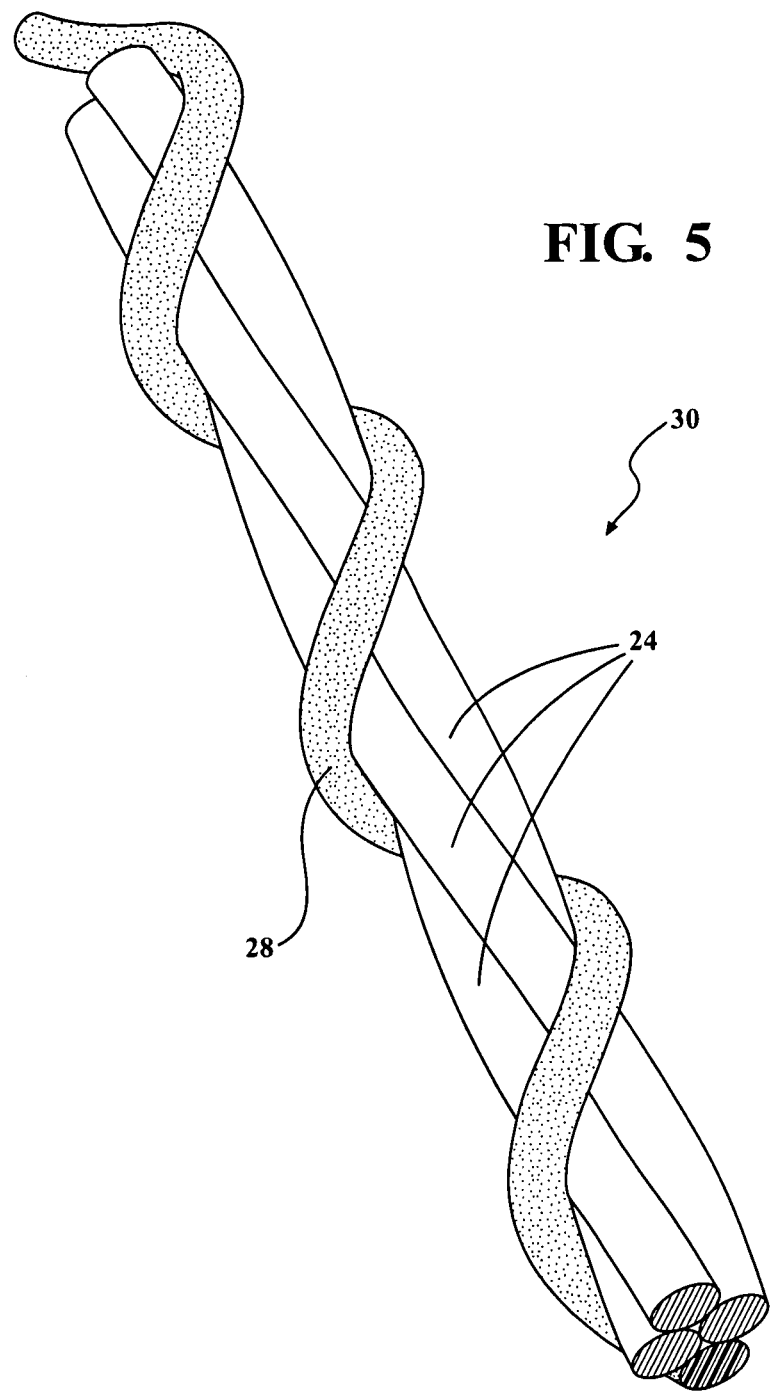
FIG. 5 is a partial cross-sectional perspective view of a commingled braid comprising three braided strands of monofilament reinforcing fiber, and one strand of monofilament binding fiber counter-wrapped helically about the three braided strands of reinforcing fiber.

As an example of the embodiment of the commingled braid 30 described immediately above, FIG. 2 is a partial cross-sectional perspective view of the commingled braid 30 comprising four braided strands of reinforcing yarn comprising the reinforcing fibers 24, and a single strand of monofilament binding fiber counter-wrapped helically about the four braided strands of reinforcing yarn. Alternatively, the commingled braid 30 of FIG. 2 can be described as the commingled braid 30 comprising four braided reinforcing ends (e.g. glass ends) having a monofilament binding end counter-wrapped helically thereabout.

As another example of the embodiment of the commingled braid 30 described above, FIG. 3 is a partial cross-sectional perspective view of the commingled braid 30 comprising four braided strands of reinforcing yarn comprising the reinforcing fibers 24, and two strands of monofilament binding fiber counter-wrapped helically about the four braided strands of reinforcing yarn. Alternatively, the commingled braid 30 of FIG. 3 can be described as the commingled braid 30 comprising four braided reinforcing ends (e.g. glass ends) having two monofilament binding ends counter-wrapped helically thereabout.

As yet another example of the embodiment of the commingled braid 30 described above, FIG. 4 is a partial cross-sectional perspective view of the commingled braid 30 comprising four braided strands of reinforcing yarn comprising the reinforcing fibers 24, and two strands of monofilament binding fiber 28 cross-wrapped about the four braided strands of reinforcing yarn. Alternatively, the commingled braid 30 of FIG. 4 can be described as the commingled braid 30 comprising four braided reinforcing ends (e.g. glass ends) having two monofilament binding ends cross-wrapped thereabout.

As still yet another example of the embodiment of the commingled braid 30 described above, FIG. 5 is a partial cross-sectional perspective view of the commingled braid 30 comprising three braided strands of monofilament reinforcing fiber, and one strand of monofilament binding fiber 28 counter-wrapped helically about the three braided strands of reinforcing fiber. Alternatively, the commingled braid 30 of FIG. 5 can be described as the commingled braid 30 comprising three braided monofilament reinforcing ends (e.g. glass ends) having one monofilament binding ends cross-wrapped thereabout.

As alluded to above, in one embodiment, the commingled braid 30 comprises a monofilament or multifilament binding fibers 28 braided to twisted with monofilament or multifilament reinforcing fiber. That is, the commingled braid 30 comprises the reinforcing fibers 24 and the binding fibers 28 braided or twisted together. In this embodiment from 1 to 15, alternatively from 1 to 8, strands of monofilament or multifilament reinforcing fibers 24 can be braided with from 1 to 6, alternatively from 1 to 3, strands of monofilament or multifilament binding fiber.

Figure 6:
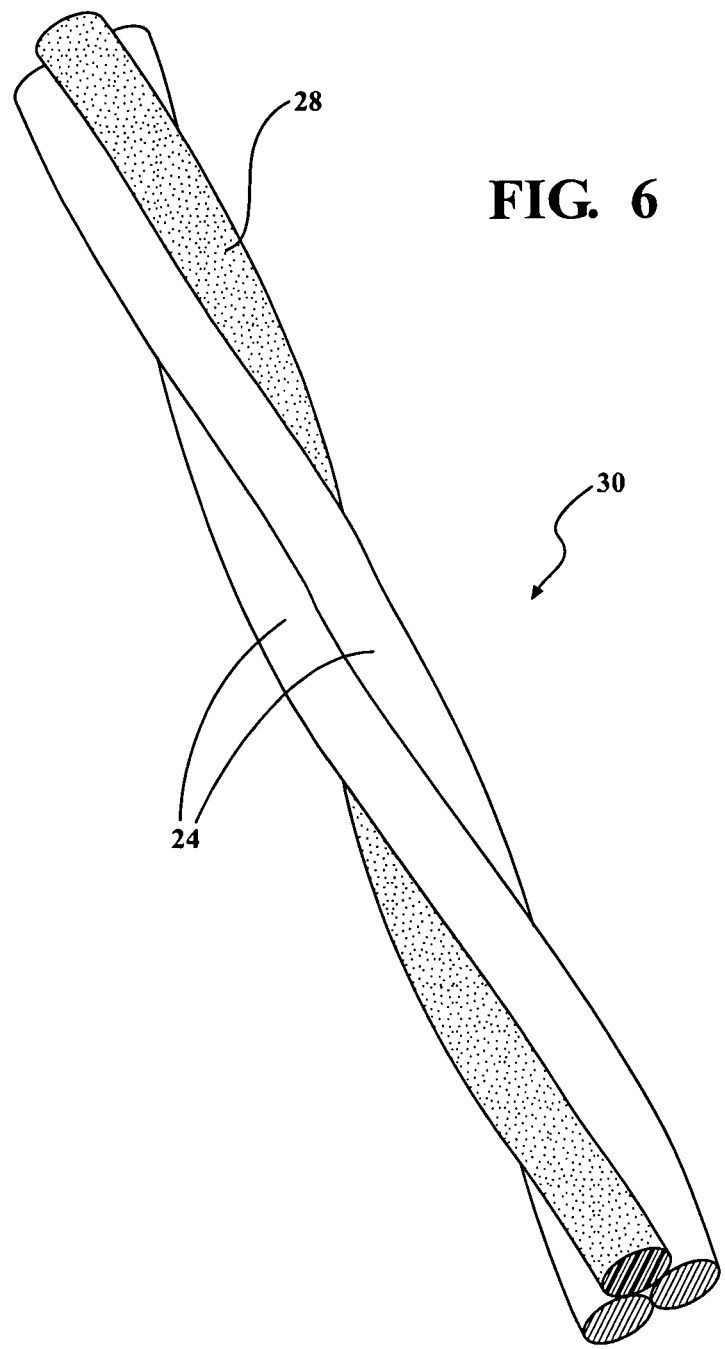
FIG. 6 is a partial cross-sectional perspective view of a commingled braid comprising two strands of monofilament reinforcing fiber braided with one strand of monofilament binding fiber.
Figure 7:
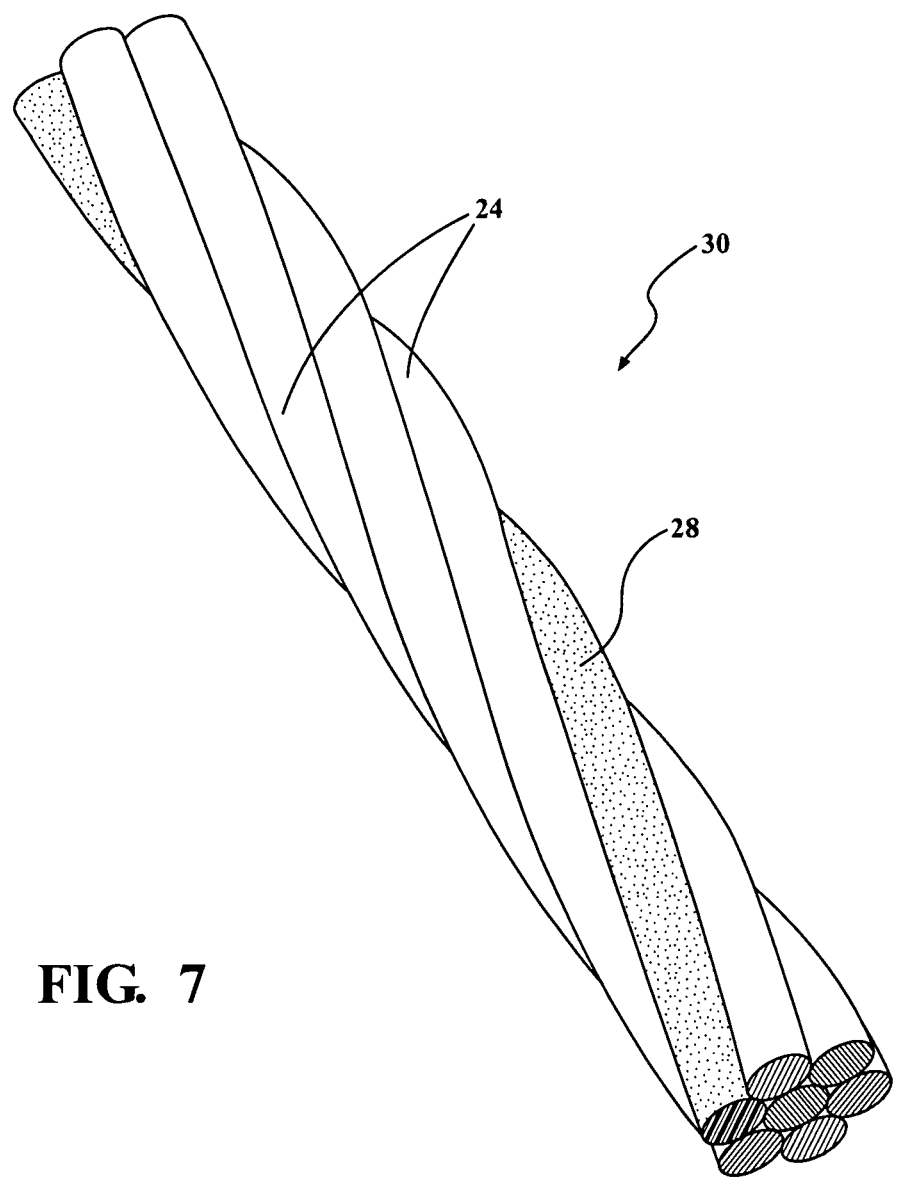
FIG. 7 is a partial cross-sectional perspective view of a commingled braid comprising six strands of monofilament reinforcing fiber braided with one strand of monofilament binding fiber.
Figure 8:
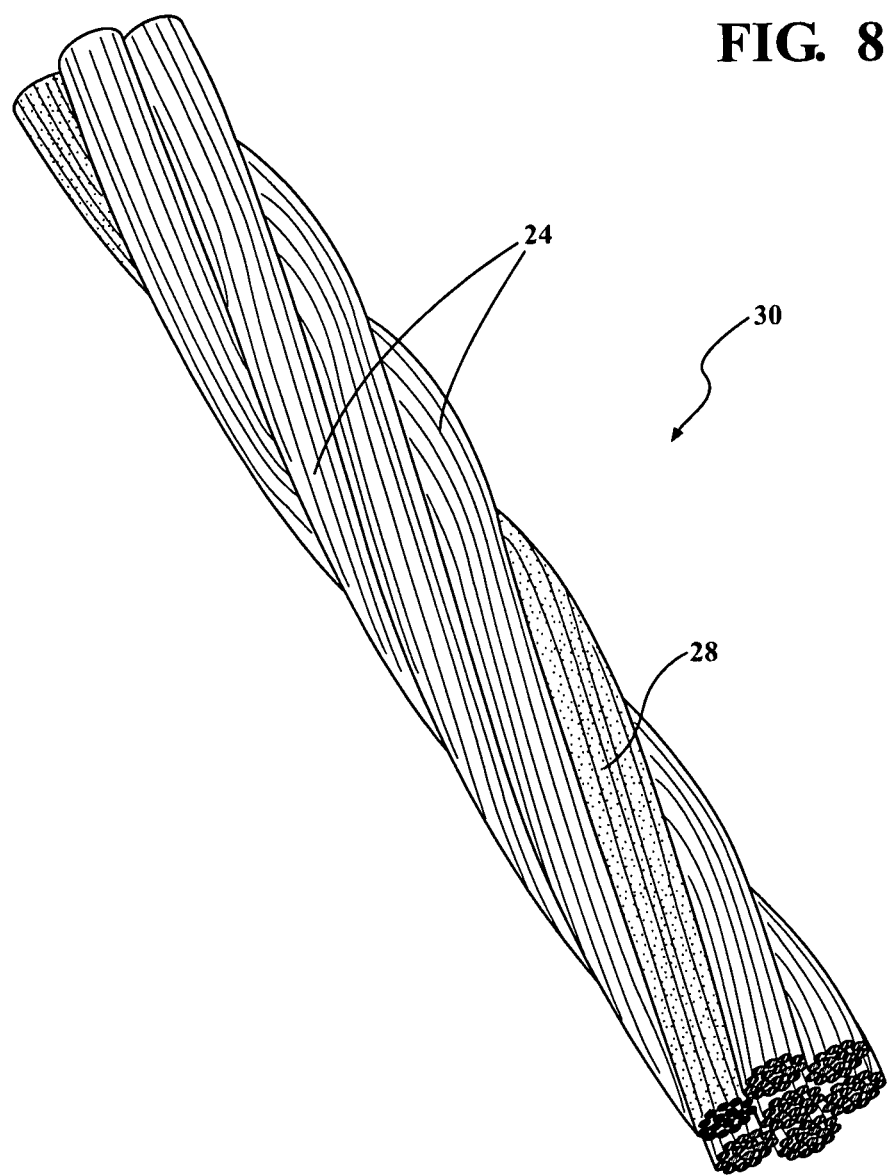
FIG. 8 is a partial cross-sectional perspective view of a commingled braid comprising six strands of multifilament reinforcing fiber braided with one strand of multifilament binding fiber.

As an example of the embodiment of the commingled braid 30 described immediately above, FIG. 6 is a partial cross-sectional perspective view of the commingled braid 30 comprising two strands of monofilament reinforcing fiber 24 braided with one strand of monofilament binding fiber. Alternatively, the commingled braid 30 of FIG. 6 can be described as the commingled braid 30 comprising two monofilament reinforcing ends (e.g. glass ends) and one monofilament binding end braided or wrapped together.

In a similar embodiment, the commingled braid 30 comprises two or more pre-braids comprising the reinforcing fibers 24 and the binding fiber. In this embodiment, the pre-braids typically comprise two strands (mono or multi-filament) of the reinforcing fibers 24 and one strand (mono or multi-filament) of the binding fiber.

As an example of the embodiment of the commingled braid 30 described above, FIG. 7 is a partial cross-sectional perspective view of the commingled braid 30 comprising six strands of monofilament reinforcing fiber 24 braided with one strand of monofilament binding fiber. Alternatively, the commingled braid 30 of FIG. 7 can be described as the commingled braid 30 comprising six monofilament reinforcing ends (e.g. glass ends) and one monofilament binding end braided or wrapped together.

As an example of the embodiment of the commingled braid 30 described above, FIG. 8 is a partial cross-sectional perspective view of the commingled braid 30 comprising six strands of multifilament reinforcing fiber 24 braided with one strand of multifilament binding fiber. Alternatively, the commingled braid 30 of FIG. 8 can be described as the commingled braid 30 comprising six multifilament reinforcing ends (e.g. glass ends) and one multifilament binding end braided or wrapped together.

The hose assembly 10 can include one or more additional protective layers. The protective layer can comprise a reinforcing layer 16, a coating layer, and/or a jacket layer. The type and amount of protective layers included in the hose assembly 10 depends on the intended use of the hose assembly 10. The additional reinforcing layers can be formed from a comingled braid or from various other embodiments know in the art.

Figure 9:
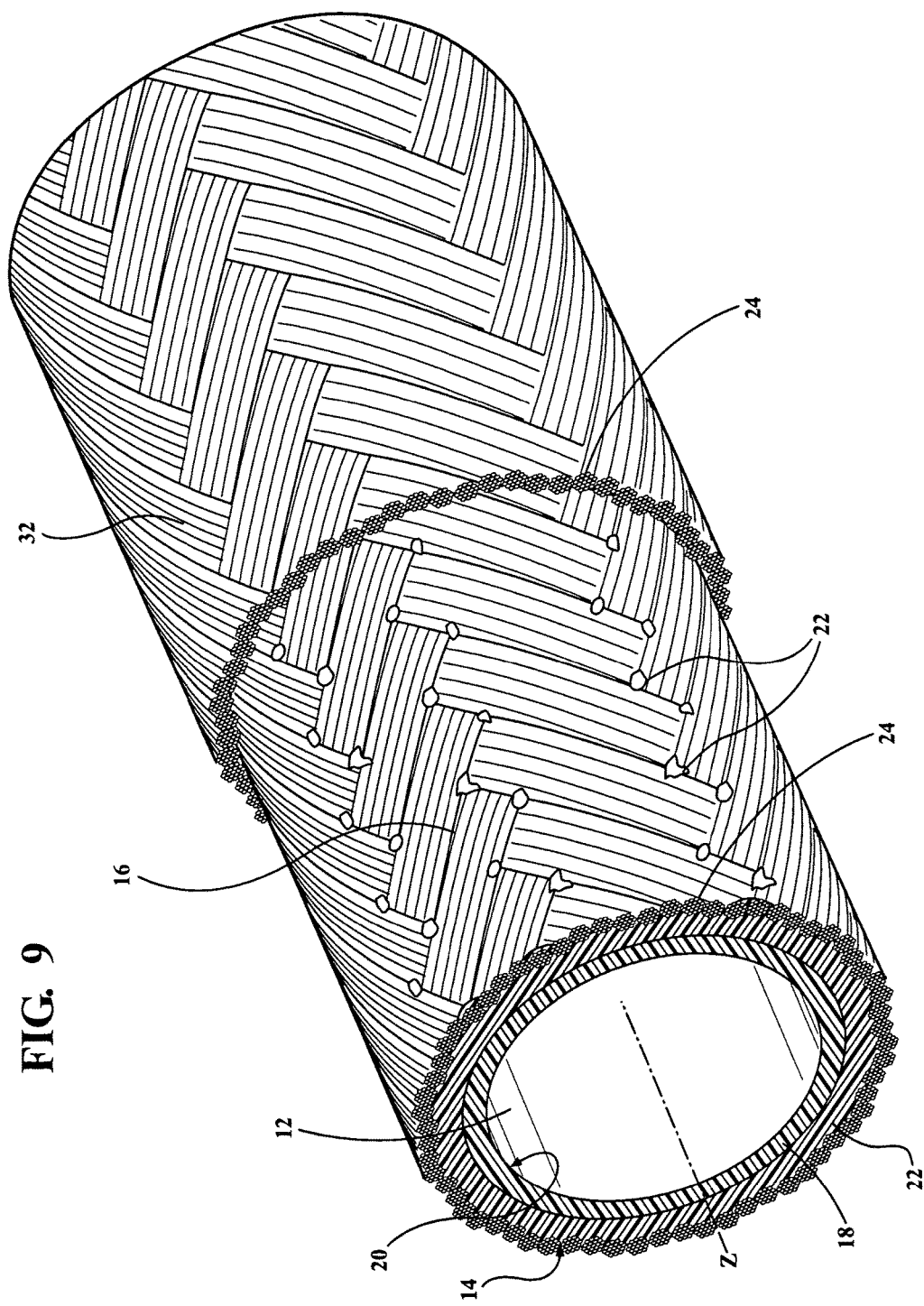
FIG. 9, is a partial cross-sectional perspective view of a hose assembly comprising a multilayer tube, a reinforcing layer, and a second reinforcing layer.

For example, the hose assembly 10 can include additional reinforcing layers. Referring now to FIG. 9, a partial cross-sectional perspective view of the hose assembly 10 comprising the multilayer tube 12, the reinforcing layer 16, and a second reinforcing layer 32 is illustrated.

Figure 10:
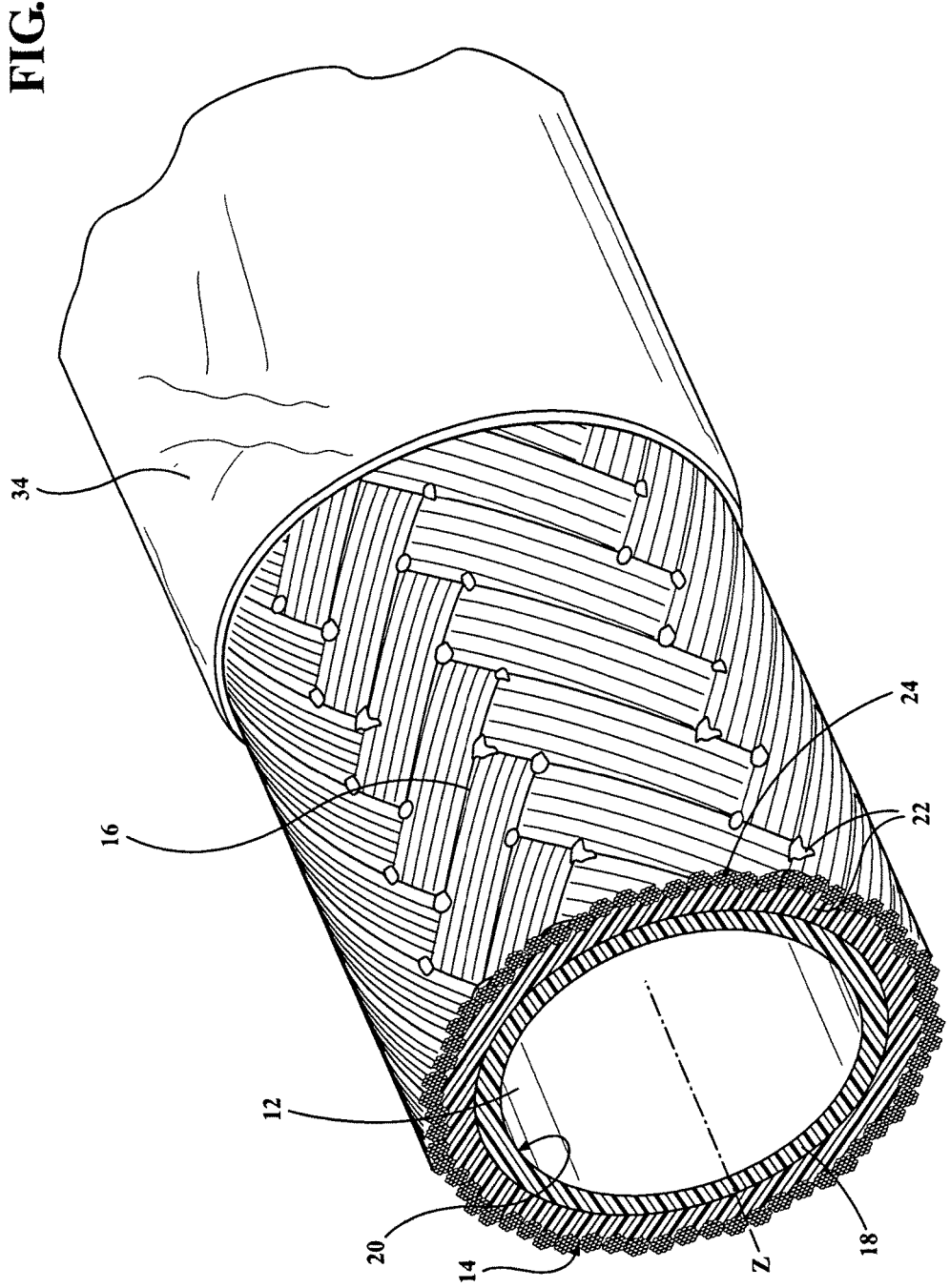
FIG. 10, is a partial cross-sectional perspective view of a hose assembly comprising multilayer tube, a reinforcing layer, and a silicone rubber jacket.
Figure 11:
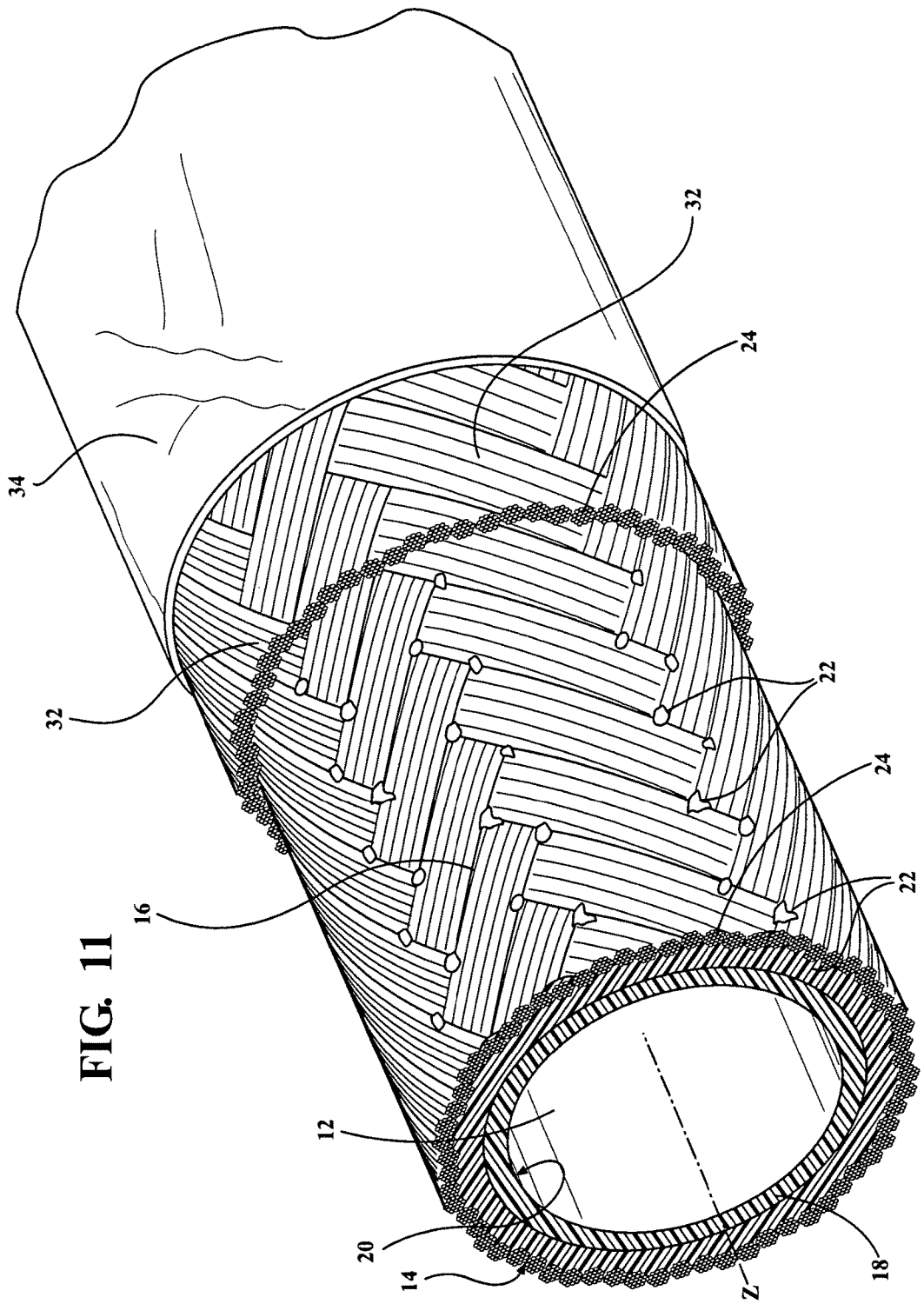
FIG. 11, is a partial cross-sectional perspective view of a hose assembly comprising multilayer tube, a reinforcing layer, a second reinforcing layer, and a silicone rubber jacket.

As another example, the hose assembly 10 can include a silicone layer 34 (e.g. a silicone rubber jacket 34). Referring now to FIG. 10, a partial cross-sectional perspective view of the hose assembly 10 comprising the multilayer tube 12, the reinforcing layer 16, and the silicone rubber jacket 34 is illustrated. Referring now to FIG. 11, a partial cross-sectional perspective view of the hose assembly 10 comprising the multilayer tube 12, the reinforcing layer 16, a second reinforcing layer 32, and the silicone rubber jacket 34 is illustrated.

The silicone rubber jacket 34 of this embodiment comprises a silicone. Of course, the silicone rubber jacket 34 can comprise one or more types of silicone. In one embodiment, the silicone jacket 34 comprises a polyalkylsiloxane such as polydimehtylsiloxane ("PDMS"). In another embodiment, the silicone jacket 34 comprises a silicone having halide functional groups (e.g. a fluoro silicone). In yet another embodiment, the silicone jacket 34 comprises a silicone having phenyl functional groups (e.g. phenyl silicone). The silicone can be room temperature vulcanizing ("RTV") silicone, which cures at room temperature, or high temperature vulcanizing ("HTV") silicone, which cures at temperatures greater than 100° C. In one embodiment, the silicone rubber jacket 34 comprises HTV silicone (either a high consistency rubber ("HCR") or a liquid silicone rubber ("LSR")). In a preferred embodiment, the silicone rubber jacket 34 is formed form HCR silicone which is a one component solid. In contrast, LSR is a two component liquid system. A free radical cure system, such as peroxide, or an addition cure system, such as platinum catalyst, can be used to form a 3-dimensional cross-linked silicone network to provide a durable and temperature resistant silicone rubber jacket 34. In a typical embodiment, a free radical peroxide catalyst is used to cure the silicone. Of course, the silicone which is used to form the silicone rubber jacket 34 can include filler and various other additives as necessary to improve the mechanical, chemical, and physical properties of the silicone rubber jacket 34. For example, a heat stabilizer or rubber modifier can be added to the silicone to improve high temperature stability and compression set performance.

When included in the hose assembly 10, the silicone rubber jacket 34 typically has a Shore A hardness of from 30 and 85, alternatively from 50 to 85. Further, the silicone rubber jacket 34 typically has a thickness of from 0.1 to 4, alternatively from 1.5 to 3.5, alternatively from 2.0 to 3.0, mm. In one specific embodiment, the silicone rubber jacket 34 is formed from HCR silicone and has a thickness of from 1 to 3 mm In another specific embodiment, the silicone rubber jacket 34 is formed from LSR and has a thickness of from 0.33 to 0.50 mm An organopolysiloxane adhesion promoter can be applied to the fibers of the reinforcing layer 16 to improve (1) adhesion of the reinforcing layer 16 to the multilayer tube 12, (2) the adhesion of the reinforcing fibers 24 of the reinforcing layer 16 to one another, and/or (3) adhesion of the silicone rubber jacket 34 to the reinforcing layer 16. The adhesion promoter wicks into the commingled braid 30 and wets out the reinforcing fibers 24 thereby binding the reinforcing fibers 24 together. In one embodiment, the adhesion promoter comprises an organopolysiloxane. In this embodiment, a silicone with a high percentage of Si—H groups can be used for cross-linking purposes, i.e., can be used to crosslink the organopolysiloxane. The cross-linker is believed to increase cohesive strength of the adhesion promoter. As thickness of the adhesion promoter increases, the cohesive strength of the adhesion promoter typically decreases. As such, application of a minimal amount of adhesion promoter to the reinforcing fibers 24 of the reinforcing layer 16 is preferred. In one embodiment, the thickness of the adhesion promoter can be minimized by dilution of the adhesion promoter and/or with use of an air knife to remove any excess adhesion promoter.

The hose assembly 10 can further include a coupling (not shown). Typically the coupling is adapted to engage at least one end of the hose assembly 10 for interconnecting the hose assembly 10 to a fluid source, such as fuel tanks. It is to be appreciated that any suitable coupling can be used with the hose assembly 10.

The hose assembly 10 has an inner diameter, an outer diameter, and a length. The inner diameter, the outer diameter, and the length of the hose assembly 10 can also vary depending on the intended use of the hose assembly 10. For example, the hose assembly 10 can have an inner diameter of two inches for use in applications that require transfer of greater volumes of fluid or an inner diameter of a half of an inch for use in applications that require transfer of lesser volumes of fluid.

A method of forming a hose assembly 10 is disclosed. The hose assembly 10 includes the multilayer tube 12 having the inner layer 18 comprising the first polymeric material and the outer layer comprising the second polymeric material and defines the outer peripheral surface 14. The hose assembly 10 also includes the reinforcing layer 16 comprising the reinforcing fibers 24 and disposed about and embedded in the outer peripheral surface 14 of the multilayer tube 12. The method comprises the steps of extruding the multilayer tube 12, and disposing the reinforcing fibers 24 about the outer peripheral surface 14 of the multilayer tube 12 to form a reinforced multilayer tube 36. The method also includes the steps of heating the reinforced multilayer tube 36 to a temperature ($T_1$) which is greater than a peak melting temperature of the second polymeric material (the outer peripheral surface 14 of the multilayer tube 12) to at least partially melt the outer layer 22, but which is less than a peak melting temperature of the first polymeric material so that the inner layer 18 and the inner peripheral surface 20 of the multilayer tube 12 does not soften or melt and thus maintains dimensional integrity, and cooling the reinforced multilayer tube 36 to solidify the melted outer layer 22 and embed the reinforcing fibers 24 in the outer layer 22 to form the hose assembly 10. As is shown throughout the figures, in various embodiments, during the step of heating, the reinforcing fibers 24 are embedded in the second polymeric material and the second polymeric material also flows into and seeps through the braid interstices of the reinforcing layer 16 thereby forming a robust bond between the multilayer tube 12 and the reinforcing layer 16.

Figure 12A:
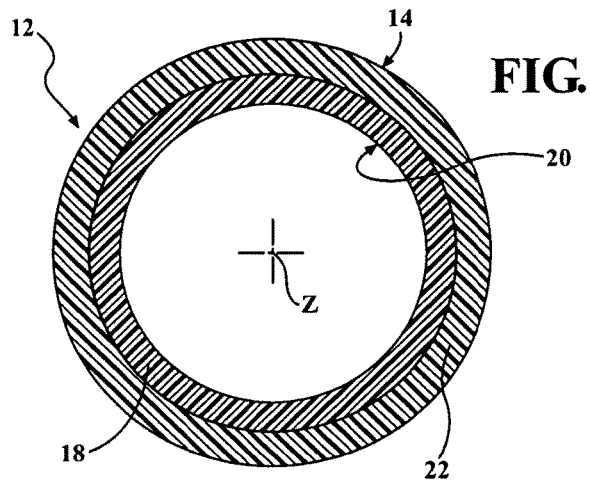
FIG. 12A is a cross-sectional view of a multilayer tube after extrusion.
Figure 12B:
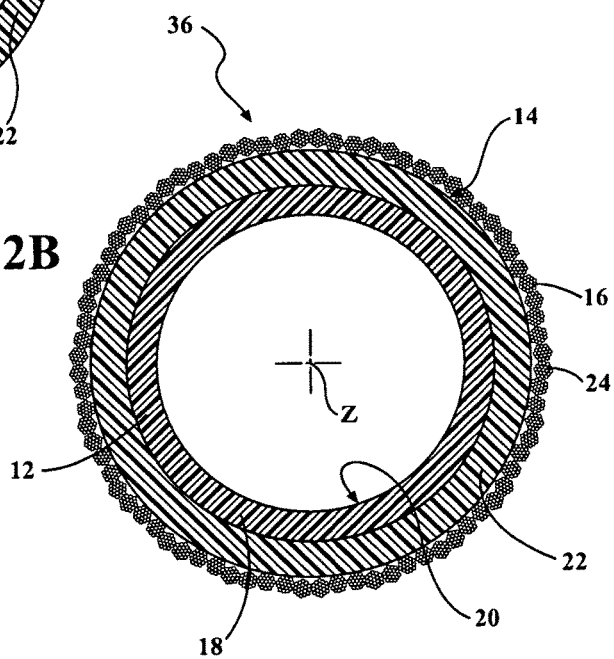
FIG. 12B is a cross-sectional view of a reinforced multilayer tube comprising a reinforcing layer disposed about an outer peripheral surface of the tube of FIG. 12A.
Figure 12C:
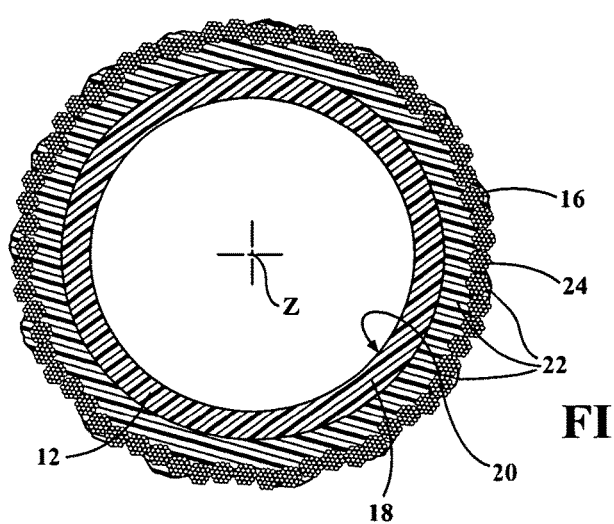
FIG. 12C is a cross-sectional view of a hose assembly formed from the reinforced tube of FIG. 12B.

Referring now to FIGS. 12A through 12C, the various steps of the method are illustrated. Specifically, FIG. 12A is a cross-sectional view of the multilayer tube 12 after extrusion, FIG. 12B is a cross-sectional view of the reinforced multilayer tube 36 comprising the reinforcing fibers 24 disposed about the outer peripheral surface 14 of the multilayer tube 12 (before the step of heating), and FIG. 12C is a cross-sectional view of the hose assembly 10 including a reinforcing layer 16 comprising the reinforcing fibers 24 and disposed about and embedded into the outer peripheral surface 14 of the multilayer tube 12 (after the steps of heating and cooling).

As set forth above, the method includes the step of extruding the multilayer tube 12. The multilayer tube 12 is just as described above. The multilayer tube 12 is extruded to the desired dimensions using melt, paste, or any other extrusion technique known in the art. Of course, in various embodiments the multilayer tube 12 has two, three, four, five, six, or more layers and is formed with techniques known in the art, such as co-extrusion techniques.

As set forth above, the method also includes the step of disposing the reinforcing fibers 24 about the outer peripheral surface 14 of the multilayer tube 12 to form the reinforced multilayer tube 36 12. Typically braids of the reinforcing fibers 24 (in the form of the commingled braid 30 in some embodiments) are disposed about the outer peripheral surface 14 of the multilayer tube 12 via braiding, helically winding, knitting, twisting, or wrapping. The multilayer tube 12 can be extruded and the commingled braid 30 disposed about the outer peripheral surface 14 of the multilayer tube 12 in a single step (in-line) or in two separate steps.

When the hose assembly 10 includes the binder 26, the method includes the step of applying the binder 26. The step of applying the binder 26 can be via application of the binder composition, the binder adhesive layer, and/or the binder fiber.

When the method includes use of the commingled braid 30, the method includes the step of forming the commingled braid 30 from the reinforcing fibers 24 and the binding fibers 28. The comingled braid is just as described above. As is described above, the commingled braid 30 can comprise various configurations of the reinforcing and the binding fiber. In one embodiment, the step of forming the commingled braid 30 from the reinforcing fibers 24 and the binding fibers 28 is further defined as braiding the reinforcing fibers 24 and the binding fibers 28 to form the commingled braid 30.

As set forth above, the method also includes the step of heating the reinforced multilayer tube 36 to a temperature ($T_1$) which is greater than an peak melting temperature of the second polymeric material to at least partially melt the outer layer 22, but which is less than the peak melting temperature of the first polymeric material so that the inner layer 18 and the inner peripheral surface 20 of the multilayer tube 12 does not soften and thus maintains dimensional integrity. $T_1$ is typically equal to or greater than 190, alternatively equal to or greater than 220, alternatively equal to or greater than 250, alternatively equal to or greater than 280, alternatively equal to or greater than 310, alternatively equal to or greater than 340, alternatively equal to or greater than 370, alternatively equal to or greater than 400, ° C.

The reinforced multilayer tube 36 is heated in an oven to soften or melt the second polymeric material (i.e., the outer peripheral surface 14 of the multilayer tube 12). During the step of heating the reinforced multilayer tube 36 having the reinforcing layer 16 applied thereto, the reinforcing layer 16 embeds in the outer peripheral surface 14 of the multilayer tube 12 and, once cooled, the reinforcing layer 16 forms a strong physical bond with the outer peripheral surface 14 of the multilayer tube 12.

When the method includes use of the commingled braid 30, the step of heating the reinforced multilayer tube 36 is further defined as heating the reinforced multilayer tube 36 to a temperature ($T_1$) equal to or greater than a peak melting temperature of the binding fibers 28 to at least partially melt the binding fibers 28, and cooling the reinforced tube to solidify the melted binding fibers 28 and form the hose assembly 10. The softening temperature, the melting temperature, or the decomposition temperature of the binding fibers 28 is from 200 to 400, alternatively from 215 to 325, alternatively from 210 to 300, ° C. A softening temperature, a peak melting temperature, and a decomposition temperature of the reinforcing fibers 24 is typically greater than 100, alternatively greater than 150, alternatively greater than 200, ° C. greater than the peak melting temperature of the binding fibers 28. As such, the binding fibers 28 melt to form the binder 26 when the reinforced tube is heated, and the reinforcing fibers 24 do not soften, melt, or degrade and, as such, maintain structural integrity.

In one such embodiment, the reinforcing fibers 24 comprise glass or ceramic fibers and have a softening temperature of at least 100° C. greater than a peak melting temperature of the binding fibers 28. In another such embodiment, the reinforcing fibers 24 comprise aramid fiber and have a decomposition temperature of at least 100° C. greater than a peak melting temperature of the binding fibers 28. In yet another such embodiment, the reinforcing fibers 24 comprise polyamide and have a peak melting temperature of at least 100° C. greater than the peak melting of the binding fibers 28.

When the hose assembly 10 is heated to a temperature such that the outer peripheral surface 14 of the multilayer tube 12 softens and the reinforcing layer 16 and the fibers thereof embedded in the outer layer 22 (in the outer peripheral surface 14) of the multilayer tube 12, the multilayer tube 12 that is electrically conductive is preferred. The electrically conductive multilayer tube 12 conducts heat more effectively and therefore facilitates the melting of the outer peripheral surface 14 of the multilayer tube 12 which, in turn, provides a robust bond between the multilayer tube 12 and the reinforcing layer 16. In one embodiment, there is about a 38° C. difference in localized temperature at the outer peripheral surface 14 of the multilayer tube 12 between the multilayer tube 12 that is conductive and the multilayer tube 12 that is non-conductive multilayer tube 12 (assuming the oven set temperatures are the same). As such, in various embodiments of the method, the conductive multilayer tube 12 is used. In one embodiment, the multilayer tube 12 comprises a conductive inner layer 18 and a non-conductive outer layer 22 which has a lower peak melting temperature than the peak melting temperature of the inner layer 18.

The method optionally includes the step of pressurizing an interior cavity of the reinforced multilayer tube 36 with a fluid such as water, an inert gas (e.g. nitrogen), or air, through an inlet and an outlet (each end of the reinforced multilayer tube 36) during the step of heating the reinforced multilayer tube 36. The cavity of the reinforced multilayer tube 36 is typically pressurized to a pressure of up to 500 (3447), alternatively from 5 to 100 (34.5 to 689.5), alternatively from 10 to 75 (68.9 to 517.1), alternatively from 20 to 60 (137.9 to 413.7), PSI (kPa). The step of pressurizing the reinforced multilayer tube 36 maintains the dimensional integrity of the reinforced multilayered tube 36 during the step of heating and also facilitates adhesion of the reinforcing layer 16 to the multilayered tube 12 because the pressure forces the fixed braid against the outer peripheral surface 14 of the multilayer tube 12.

The step of pressurizing can also create a temperature gradient/differential between the outer peripheral surface 14 of the multilayer tube 12 and the inner peripheral surface 20 of the multilayer tube 12 during the step of heating the reinforced multilayer tube 36. Of course, this temperature gradient typically decreases as process time increases, i.e., the temperature of the fluid gradually rises towards $T_1$. To this end, the fluid injected into the interior cavity of the reinforced multilayer tube 36 to pressurize the interior cavity of the reinforced multilayer tube 36 is typically injected at ambient temperatures but can be heated or cooled prior to injection. Nonetheless, the fluid typically has a temperature which is less than $T_1$. It is believed that the temperature gradient created by this step facilitates softening of the outer peripheral surface 14 of the multilayer tube 12 and thus improves the adhesion of the reinforcing layer 16 to the outer peripheral surface 14 of the multilayer tube 12 while maintaining the dimensional integrity of the internal cavity of the reinforced multilayer tube 36.

In one embodiment, the step of pressurizing is further defined as flowing or circulating inert gas through the interior cavity of the reinforced multilayer tube 36 while maintaining pressurization during the step of heating the reinforced multilayer tube 36. In this embodiment, the temperature differential between the outer peripheral surface 14 of the multilayer tube 12 and the inner peripheral surface 20 of the multilayer tube 12 can be maintained throughout the step of heating the reinforced multilayer tube 36. Said differently, the temperature gradient does not decrease as process time increases because the fluid is flowing through the interior cavity of the reinforced multilayer tube 36. The fluid which flows or circulates through the interior cavity of the reinforced multilayer tube 36 is typically at ambient temperatures, but can be heated or cooled. Nonetheless, in this embodiment, the fluid typically has a temperature which is less than $T_1$.

As set forth above, the method also includes the step of cooling the reinforced multilayer tube 36 to solidify the melted outer layer 22 and embed the reinforcing fibers 24 in the outer layer 22 to form the hose assembly 10. The step of cooling impacts the physical properties of the multilayer tube 12 by controlling the crystallinity of the polymeric material (the binder 26 and the multilayer tube 12 materials) and helps maintain the inner diameter and the outer diameter of the multilayer tube 12. After cooling, the hose assembly 10 formed exhibits an excellent bond between the outer peripheral surface 14 of the multilayer tube 12 and the reinforcing layer 16. That is, the bond is typically so strong that the reinforcing layer 16 cannot be separated or delaminated from the multilayer tube 12 without destroying the hose assembly 10. It is believed that the strength of this bond is the result of the embedding of the reinforcing fibers 24 of the reinforcing layer 16 into the outer peripheral surface 14 of the multilayer tube 12.

Figure 13A:
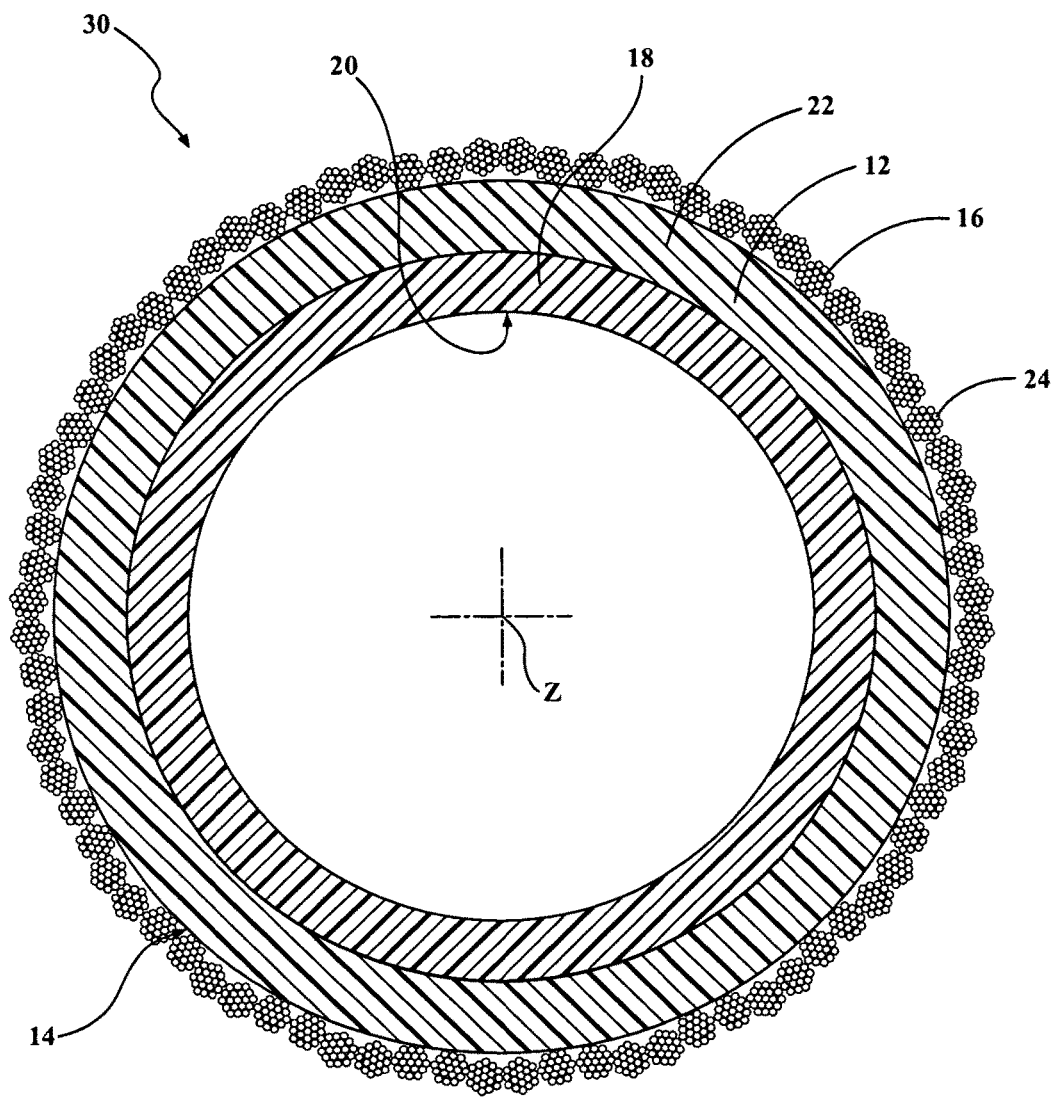
FIG. 13A is an end view of a reinforced multilayer tube comprising a reinforcing layer disposed about an outer peripheral surface of a multilayered tube.
Figure 13B:
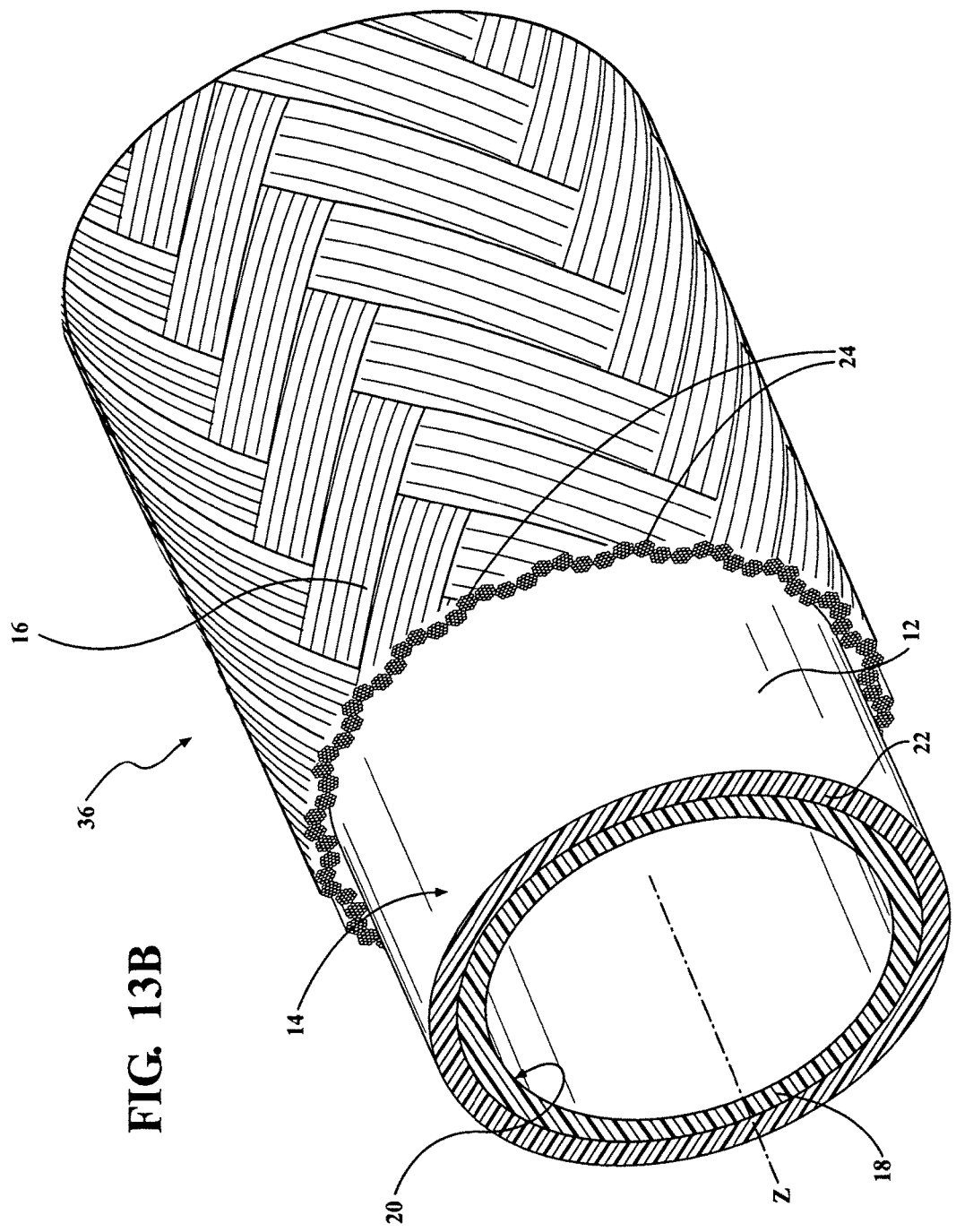
FIG. 13B is a partial cross-sectional perspective view of a reinforced multilayer tube comprising a reinforcing layer disposed about an outer peripheral surface of a multilayered tube.
Figure 13C:
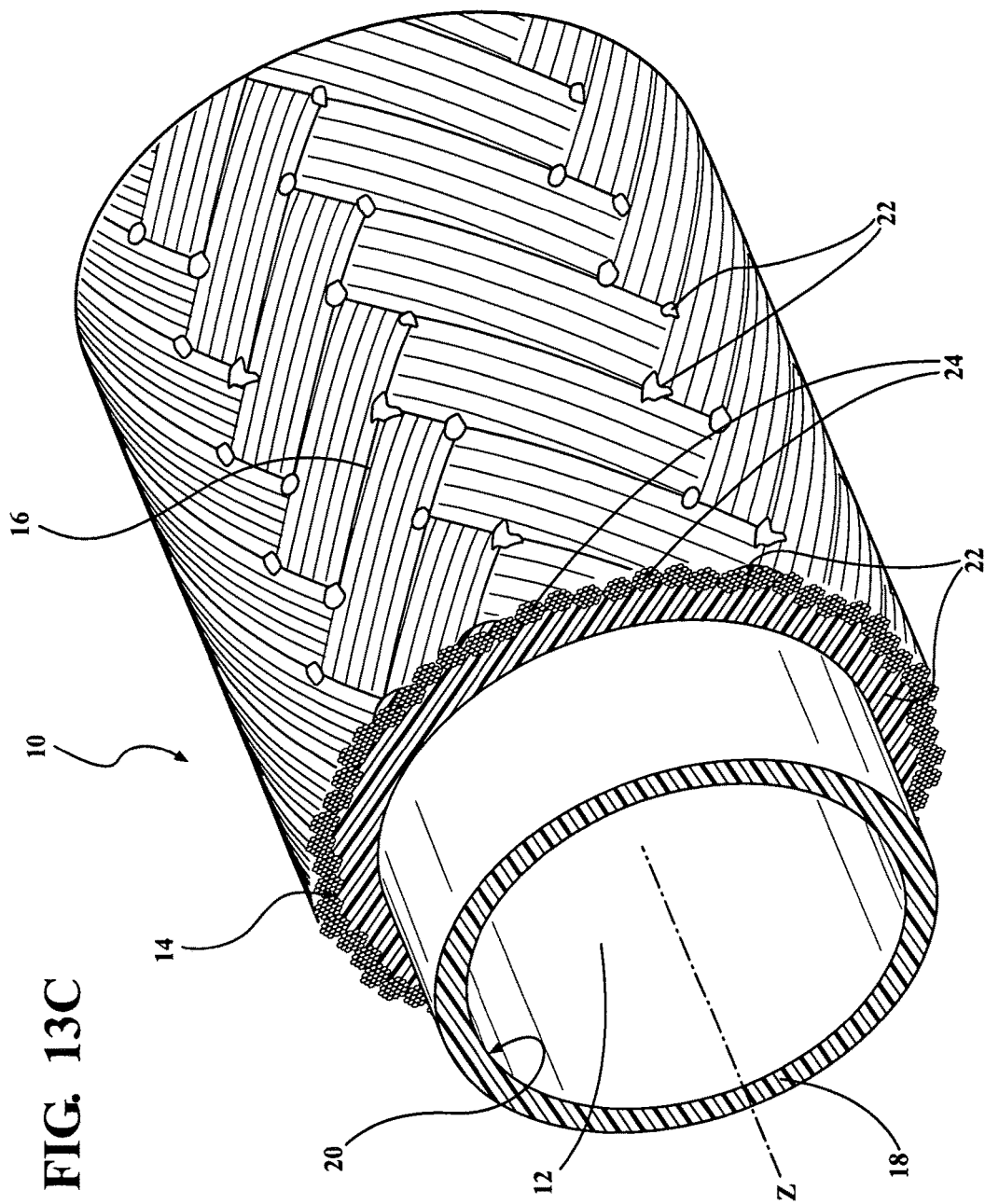
FIG. 13C is a partial cross-sectional perspective view of a hose assembly formed from the reinforced multilayer tube of FIGS. 13A and 13B.

Referring now to FIGS. 13A-13C, FIG. 13A is an end view of the reinforced multilayer tube 36 comprising braided reinforcing fibers 24 disposed about the outer peripheral surface 14 of the multilayer tube 12. FIG. 13B is a partial cross-sectional perspective view of the reinforced multilayer tube 36 comprising braided reinforcing fibers 24 disposed about the outer peripheral surface 14 of the multilayer tube 12. FIGS. 13A and 13B are prior to the steps of heating the reinforced multilayer tube 36 12 to a temperature ($T_1$) which is greater than a peak melting temperature of the second polymeric material to at least partially melt the outer layer 22, but which is less than a peak melting temperature of the first polymeric material so that the inner layer 18 and the inner peripheral surface 20 14 of the multilayer tube 12 does not soften and thus maintains dimensional integrity, and cooling the reinforced multilayer tube 36 to embed the reinforcing fibers 24 of the reinforcing layer 16 into the outer peripheral surface 14 of the multilayer tube 12 and form the hose assembly 10. FIG. 13C is a partial cross-sectional perspective view of the hose assembly 10 comprising the reinforcing layer 16 disposed about and embedded in the outer peripheral surface 14 of the multilayer tube 12 which is formed from the reinforced multilayer tube 36 of FIGS. 13A and 13B (after the steps of heating and cooling).

Figure 14A:
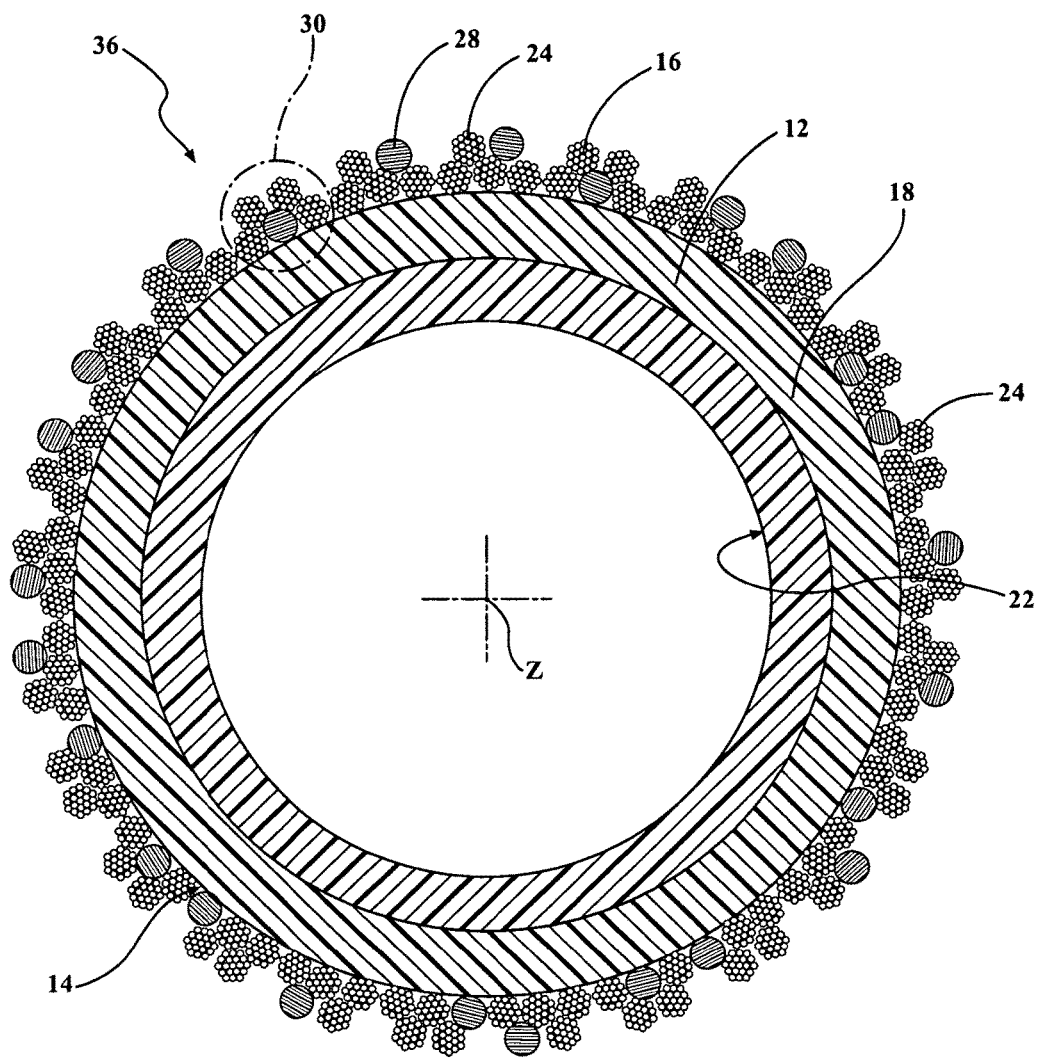
FIG. 14A is an end view of a reinforced multilayer tube comprising the commingled braid of FIG. 2 disposed about an outer peripheral surface of a multilayer tube.
Figure 14B:
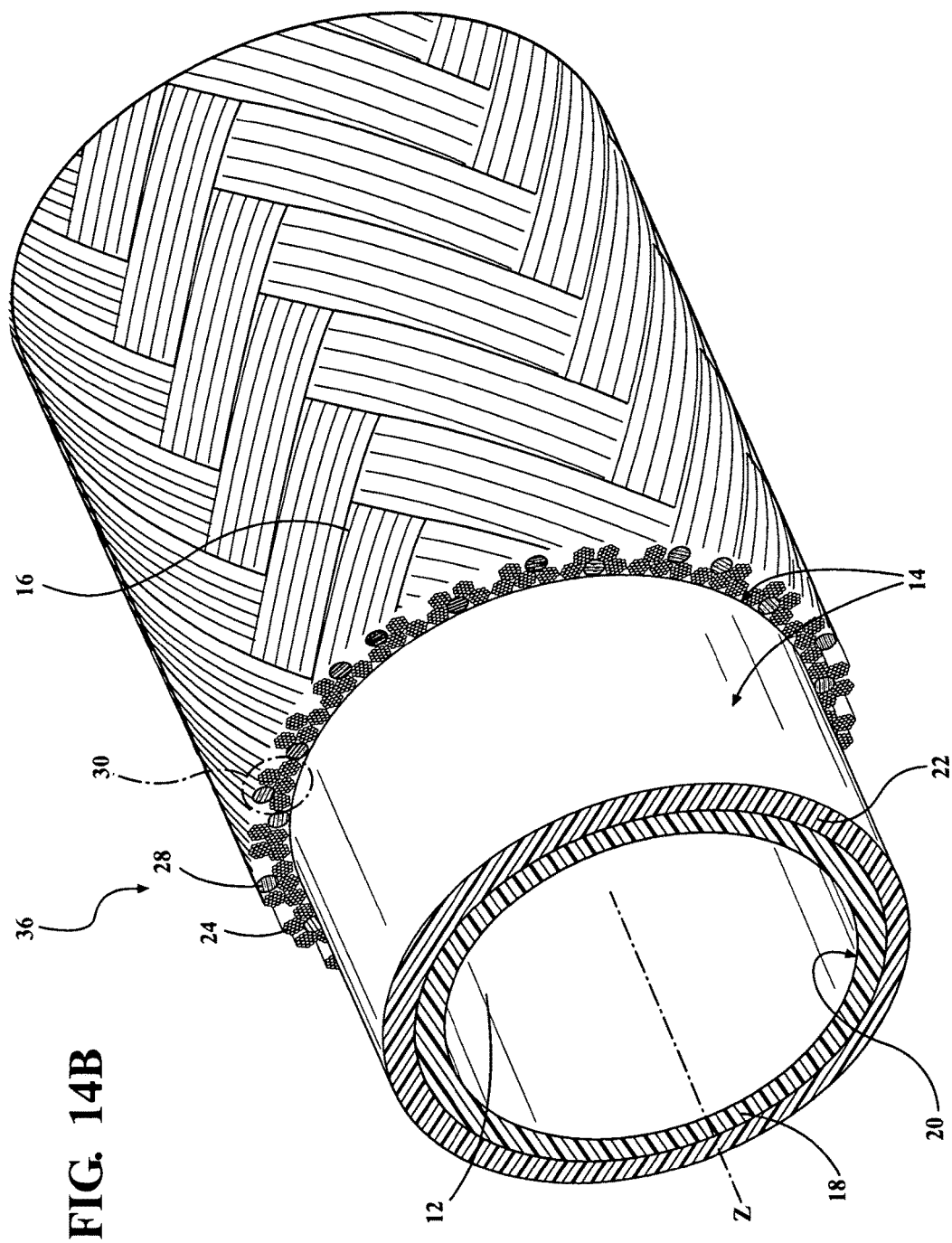
FIG. 14B is a partial cross-sectional perspective view of a reinforced multilayer tube comprising the commingled braid of FIG. 2 disposed about an outer peripheral surface of a multilayer tube.
Figure 14C:
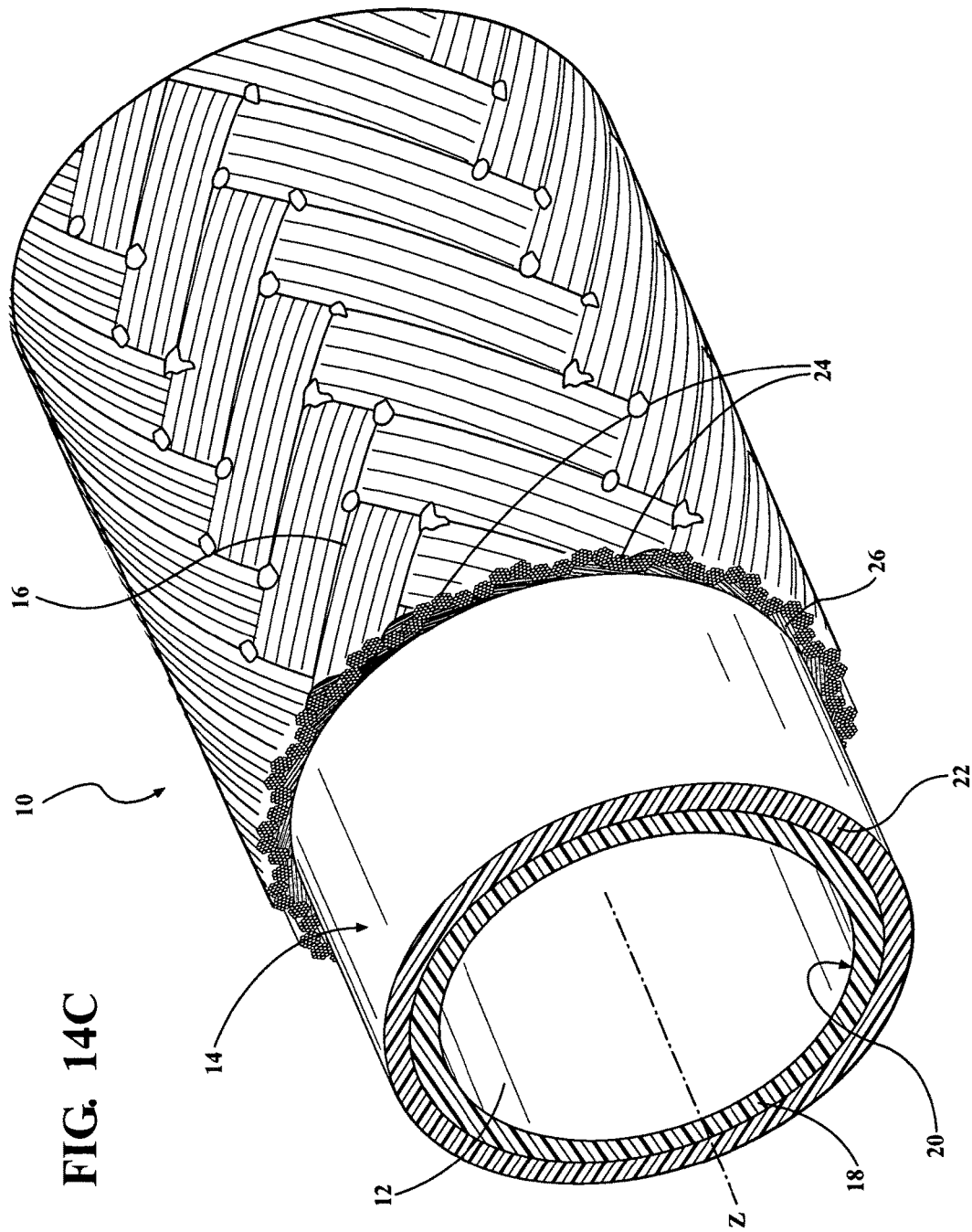
FIG. 14C is a partial cross-sectional perspective view of a hose assembly formed from the reinforced multilayer tube of FIGS. 14A and 14B.

Referring now to FIGS. 14A-14C, FIG. 14A is an end view of the reinforced multilayer tube 36 comprising the commingled braid 30 of FIG. 2 disposed about the outer peripheral surface 14 of the multilayer tube 12. FIG. 14B is a partial cross-sectional perspective view of the reinforced multilayer tube 36 comprising the commingled braid 30 of FIG. 2 disposed about the outer peripheral surface 14 of the multilayer tube 12. FIGS. 14A and 14B are prior to the steps of heating the reinforced multilayer tube 36 to a temperature ($T_1$), and cooling the reinforced multilayer tube 36 to form the hose assembly 10. FIG. 14C is a partial cross-sectional perspective view of the hose assembly 10 comprising the multilayered tube 12 and the reinforcing layer 16 disposed about the outer peripheral surface 14 of the multilayered tube 12 which is formed from the reinforced multilayered tube of FIGS. 14A and 14B (after the steps of heating and cooling).

In the embodiment of FIGS. 14A through 14C, the reinforced multilayer tube 36 is typically heated to a temperature ($T_1$) which is (1) equal to or greater than the peak melting temperature of the material of the second polymeric material (the material of the outer peripheral surface 14 of the multilayer tube 12) and (2) greater than the peak melting temperature of the binding fibers 28 of the commingled braid 30s. To this end, the peak melting temperature of the second polymeric material of the outer peripheral surface 14 of the multilayer tube 12 is about the same as (within 20° C. of) the peak melting temperature of the binding fiber. Preferably, the peak melting temperature of the second polymeric material of the outer peripheral surface 14 of the multilayer tube 12 is at or near the peak melting temperature of the binding fiber. In this embodiment, the second polymeric material which defines the outer peripheral surface 14 of the multilayer tube 12, has a peak melting temperature of within 100° C. of, alternatively within 50° C. of, alternatively within 20° C. of, the peak melting temperature of the binding fiber. Within as used herein is defined as within plus or minus the degrees specified, e.g. within 20° C. is defined as within plus 20° C. and minus 20° C. (for a total range of 40° C.).

The method optionally includes the step of cross-linking the second polymeric material of the outer layer 22 of the multilayer tube 12 of the hose assembly 10. The second polymeric material can be cross-linked with heat, ultraviolent radiation (UV), electron beam, and combinations thereof. The step of cross-linking is typically conducted subsequent to the step of heating the reinforced multilayer tube 36. If the step cross-linking is conducted prior to the step of heating the reinforced multilayer tube 36 the second polymeric material will not flow well into the braid interstices. In a preferred embodiment, the second polymeric material of the outer layer 22 of the multilayer tube 12 of the hose assembly 10 is cross-linked with an electron beam. The physical properties of the first polymeric material (and any intermediate layers within the multilayer tube 12) should not be degraded during the cross-linking (e.g. electron beam) process. As such, the first polymeric material of the inner layer 18 and the polymeric material of any intermediate layers must be selected appropriately. In various embodiments, the first polymeric material can be cross-linked to improve the properties of the first polymeric material and also prevent degradation of the material's physical properties when the second polymeric material is cross-linked.

In one embodiment, when the method includes use of the commingled braid 30, the binding fibers 28 comprise a fluoropolymer selected from the group of polytetrafluoroethylene, fluorinated ethylene propylene, perfluoroalkoxy, and ethylenetetrafluoroethylene, and the polymeric material defining the outer peripheral surface 14 of the multilayer tube 12 comprises a fluoropolymer. In this embodiment, the fluoropolymer binding fibers 28 melt to form the binder 26 which is compatible with, and exhibits robust adhesion to, the multilayer comprising fluoropolymer.

In another embodiment, when the method includes use of the commingled braid 30, the binding fibers 28 comprise a polyamide selected from the group of PA11, PA12, PA610, PA612, PA1010, PA6, PA66, PA1110T, and PA1212T, and the polymeric material defining the outer peripheral surface 14 of the multilayer tube 12 comprises a polyamide. In this embodiment, the polyamide binding fibers 28 melt to form the binder 26 which is compatible with, and exhibits robust adhesion to, the multilayer tube 12 comprising polyamide.

It is to be understood that the appended claims are not limited to express and particular compounds, compositions, or methods described in the detailed description, which may vary between particular embodiments which fall within the scope of the appended claims. With respect to any Markush groups relied upon herein for describing particular features or aspects of various embodiments, it is to be appreciated that different, special, and/or unexpected results may be obtained from each member of the respective Markush group independent from all other Markush members. Each member of a Markush group may be relied upon individually and or in combination and provides adequate support for specific embodiments within the scope of the appended claims.

It is also to be understood that any ranges and subranges relied upon in describing various embodiments of the present disclosure independently and collectively fall within the scope of the appended claims, and are understood to describe and contemplate all ranges including whole and/or fractional values therein, even if such values are not expressly written herein. One of skill in the art readily recognizes that the enumerated ranges and subranges sufficiently describe and enable various embodiments of the present disclosure, and such ranges and subranges may be further delineated into relevant halves, thirds, quarters, fifths, and so on. As just one example, a range "of from 0.1 to 0.9" may be further delineated into a lower third, i.e., from 0.1 to 0.3, a middle third, i.e., from 0.4 to 0.6, and an upper third, i.e., from 0.7 to 0.9, which individually and collectively are within the scope of the appended claims, and may be relied upon individually and/or collectively and provide adequate support for specific embodiments within the scope of the appended claims. In addition, with respect to the language which defines or modifies a range, such as "at least," "greater than," "less than," "no more than," and the like, it is to be understood that such language includes subranges and/or an upper or lower limit. As another example, a range of "at least 10" inherently includes a subrange of from at least 10 to 35, a subrange of from at least 10 to 25, a subrange of from 25 to 35, and so on, and each subrange may be relied upon individually and/or collectively and provides adequate support for specific embodiments within the scope of the appended claims. Finally, an individual number within a disclosed range may be relied upon and provides adequate support for specific embodiments within the scope of the appended claims. For example, a range "of from 1 to 9" includes various individual integers, such as 3, as well as individual numbers including a decimal point (or fraction), such as 4.1, which may be relied upon and provide adequate support for specific embodiments within the scope of the appended claims.

The present disclosure has been described in an illustrative manner, and it is to be understood that the terminology which has been used is intended to be in the nature of words of description rather than of limitation. Many modifications and variations of the present disclosure are possible in light of the above teachings. It is, therefore, to be understood that within the scope of the appended claims, the present disclosure may be practiced otherwise than as specifically described.

What is claimed is:

1. A method for forming a hose assembly, the hose assembly including a multilayer tube having an inner layer comprising a fluoropolymer and an outer layer comprising a polyamide and defining an outer peripheral surface of the multilayer tube, and a reinforcing layer comprising reinforcing fibers and disposed about and embedded in the outer peripheral surface of the multilayer tube, said method comprising the steps of:

extruding the multilayer tube comprising the inner layer comprising the fluoropolymer and the outer layer comprising the polyamide, wherein a peak melting temperature of the fluoropolymer is at least 15° C. greater than a peak melting temperature of the polyamide;

disposing reinforcing fibers about the outer peripheral surface of the multilayer tube to form a reinforced multilayer tube;

heating the reinforced multilayer tube with an oven to a temperature (T1) which is greater than a peak melting temperature of the polyamide to at least partially melt the outer layer, but which is less than a peak melting temperature of the fluoropolymer so that the inner layer and inner peripheral surface of the multilayer tube does not soften and thus maintains dimensional integrity while the polyamide flows into and seeps through braid interstices of the reinforcing layer to form a robust bond between the multilayer tube and reinforcing fibers;

pressurizing an interior cavity of the reinforced multilayer tube with a fluid during the step of heating the reinforced multilayer tube; and cooling the reinforced multilayer tube to solidify the melted outer layer and embed the reinforcing fibers in the outer layer to form the hose assembly.

2. The method as set forth in claim 1 wherein the peak melting temperature of the fluoropolymer is at least 25° C. greater than the peak melting temperature of the polyamide.

3. The method as set forth in claim 1 wherein the step of disposing the reinforcing fibers about the outer peripheral surface of the multilayer tube to form the reinforced multilayer tube is further defined as braiding the reinforcing fibers about the outer peripheral surface of the multilayer tube.

4. The method as set forth in claim 1 further comprising a step of cross-linking the polyamide of the outer layer of the multilayer tube of the hose assembly.

5. The method as set forth in claim 4 wherein the step of cross-linking the outer layer of the multilayer tube of the hose assembly is further defined as cross-linking the polyamide of the multilayer tube of the hose assembly with an electron beam.

6. The method as set forth in claim 1 wherein the step of disposing the reinforcing fibers about the outer peripheral surface of the multilayer tube to form the reinforced multilayer tube is further defined as disposing commingled braids comprising reinforcing fibers and binding fibers about the outer peripheral surface of multilayer tube to form the reinforced multilayer tube, wherein a softening temperature, a peak melting temperature, or a decomposition temperature of the reinforcing fibers is at least 100° C. greater than a softening temperature or peak melting temperature of the binding fibers.

7. The method as set forth in claim 6 wherein the step of disposing the commingled braids about the outer peripheral surface of the multilayer tube is further defined as disposing the commingled braids which comprise from 55 to 95 percent by volume reinforcing fiber and from 5 to 45 percent by volume binding fiber about the outer peripheral surface of the multilayer tube.

8. The method as set forth in claim 6 wherein the binding fiber has a peak melting temperature of from 200 to 400° C.

9. The method as set forth in claim 6 wherein the polyamide, which defines the outer peripheral surface of the multilayer tube, has a peak melting temperature up to 100° C. greater than the peak melting temperature of the binding fiber.

10. The method as set forth in claim 1 further comprising the step of disposing a silicone layer about the reinforcing layer.

11. The method as set forth in claim 1 wherein the step of pressurizing an interior cavity of the reinforced multilayer tube with a fluid during the step of heating the reinforced multilayer tube is further defined as pressurizing the interior cavity of the reinforced multilayer tube with a fluid during the step of heating the reinforced multilayer tube to a pressure of up to 500 PSI.

12. The method as set forth in claim 1 wherein the multilayer tube is electrically conductive.

* * * * *

UNITED STATES PATENT AND TRADEMARK OFFICE
CERTIFICATE OF CORRECTION

PATENT NO. : 10,281,064 B2
APPLICATION NO. : 14/443221
DATED : May 7, 2019
INVENTOR(S) : Leo Moreau et al.

It is certified that error appears in the above-identified patent and that said Letters Patent is hereby corrected as shown below:

On the Title Page

Item (60) in the provisional date section: Please delete "November 16, 2013" and replace with:
-- November 16, 2012 --.

Signed and Sealed this
Twentieth Day of August, 2019

Andrei Iancu
*Director of the United States Patent and Trademark Office*